(12) United States Patent
Sweeney et al.

(10) Patent No.: US 7,615,246 B2
(45) Date of Patent: Nov. 10, 2009

(54) PELLET SYSTEMS FOR PREPARING BEVERAGES

(75) Inventors: John F. Sweeney, St. Michael, MN (US); Peter C. Dea, San Ramon, CA (US); William R. Aimutis, Blaine, MN (US); Vincent M. Cavallini, Edina, MN (US); Karla J. Nelson, Minneapolis, MN (US); Serpil Metin, Eden Prairie, MN (US)

(73) Assignee: Cargill, Incorporated, Wayzata, MN (US)

( * ) Notice: Subject to any disclaimer, the term of this patent is extended or adjusted under 35 U.S.C. 154(b) by 258 days.

(21) Appl. No.: 11/803,767

(22) Filed: May 16, 2007

(65) Prior Publication Data

US 2007/0224328 A1   Sep. 27, 2007

Related U.S. Application Data

(62) Division of application No. 10/820,899, filed on Apr. 8, 2004.

(60) Provisional application No. 60/462,222, filed on Apr. 11, 2003.

(51) Int. Cl.
*A23C 9/15* (2006.01)

(52) U.S. Cl. ............... 426/580; 426/515; 426/548; 426/586; 426/587; 426/588; 426/590

(58) Field of Classification Search ........... 426/515, 426/548, 564, 565, 580, 586, 587, 588, 590
See application file for complete search history.

(56) References Cited

U.S. PATENT DOCUMENTS

| | | | |
|---|---|---|---|
| 3,162,019 A | 12/1964 | Porter et al. | |
| 3,228,838 A | 1/1966 | Rinfret et al. | |
| 3,479,187 A | 11/1969 | Arbuckle | |
| 3,619,205 A | 11/1971 | LeVan et al. | |
| 3,800,036 A | 3/1974 | Gabby et al. | |
| 3,969,531 A | 7/1976 | Cornelius | |
| 3,987,211 A | 10/1976 | Dunn et al. | |
| 4,073,158 A | 2/1978 | Guiller | |
| 4,242,367 A | 12/1980 | Igoe | |
| 4,251,547 A | 2/1981 | Liggett | |
| 4,265,921 A | 5/1981 | Lermuzeaux | |
| 4,285,490 A | 8/1981 | Hanley | |
| 4,293,580 A | 8/1981 | Hanley | |
| 4,335,584 A | 6/1982 | Lermuzeaux | |
| 4,376,791 A | 3/1983 | Holbrook et al. | |
| 4,420,948 A | 12/1983 | Savage | |
| 4,421,778 A | 12/1983 | Kahn et al. | |
| 4,434,186 A | 2/1984 | Desia et al. | |
| 4,479,363 A | 10/1984 | Gibson et al. | |
| 4,542,035 A | 9/1985 | Huang et al. | |
| 4,552,773 A | 11/1985 | Kahn et al. | |
| 4,609,561 A | 9/1986 | Wade et al. | |
| 4,655,047 A | 4/1987 | Temple et al. | |
| 4,687,672 A | 8/1987 | Vitkovsky | |
| 4,704,873 A | 11/1987 | Imaike et al. | |
| 4,707,997 A | 11/1987 | Bigler et al. | |
| 4,737,372 A | 4/1988 | Bender et al. | |
| 4,748,029 A | 5/1988 | Alfred et al. | |
| 4,761,962 A | 8/1988 | Andersson | |
| 4,767,307 A | 8/1988 | Beer | |
| 4,808,428 A | 2/1989 | Forsstrom et al. | |
| 4,816,283 A | 3/1989 | Wade et al. | |
| 4,828,866 A | 5/1989 | Wade et al. | |
| 4,829,783 A | 5/1989 | Buchmuller et al. | |
| 4,830,868 A | 5/1989 | Wade et al. | |
| 4,843,840 A | 7/1989 | Gibson | |
| 4,853,243 A | 8/1989 | Kahn et al. | |
| 4,876,106 A | 10/1989 | Sabatura | |
| 4,914,927 A | 4/1990 | Miller et al. | |
| 4,935,258 A | 6/1990 | Wade et al. | |
| 4,951,472 A | 8/1990 | Hansen et al. | |
| 4,959,227 A | 9/1990 | Amer | |
| 4,967,571 A | 11/1990 | Sporri | |
| 4,971,824 A | 11/1990 | Jonas | |
| 4,982,577 A | 1/1991 | Milankov et al. | |
| 4,986,994 A | 1/1991 | Baccus, Jr. | |

(Continued)

FOREIGN PATENT DOCUMENTS

| | | |
|---|---|---|
| CA | 964921 | 3/1975 |
| EP | 1195096 A1 | 2/1989 |
| EP | 0303374 | 10/1990 |
| EP | 0395145 | 10/1990 |
| EP | 0 395 145 B1 | 6/1993 |
| EP | 1195096 A1 | 4/2002 |
| GB | 1 376 972 | 12/1974 |
| GB | 2092880 | 8/1982 |
| JP | 62207174 | 8/1987 |
| JP | 04106549 | 11/1993 |
| JP | 06097948 | 12/1994 |

OTHER PUBLICATIONS

"GNPD/Lemon Lime Ice Cream Pellets," Global New Products Database at http://www.gnpd.com/sinatra/gnpd&lang=uk/search/results&selection=pg&page0%, printed from internet on Apr. 22, 2003, 2 pages.

(Continued)

*Primary Examiner*—Leslie Wong
(74) *Attorney, Agent, or Firm*—Edward L. Levine

(57) ABSTRACT

Methods, compositions, and articles of manufacture for preparing frozen beverages are described. The methods and articles generally include first and/or second frozen pellets. Upon mixing the frozen pellets with an appropriate liquid for a sufficient time, a frozen beverage is obtained. Articles of manufacture including frozen pellets, as well as optional objects such as straws, spoons, and mixing containers are disclosed. Methods, compositions, and articles of manufacture for preparing frozen pellets are also described.

8 Claims, No Drawings

U.S. PATENT DOCUMENTS

| | | | |
|---|---|---|---|
| 4,988,529 A | 1/1991 | Nakaya et al. |
| 5,006,359 A | 4/1991 | Senda |
| 5,024,849 A | 6/1991 | Rasilewicz |
| 5,036,673 A | 8/1991 | Miller et al. |
| D321,580 S | 11/1991 | Jones |
| 5,064,678 A | 11/1991 | Klemann et al. |
| 5,069,924 A | 12/1991 | Baccus, Jr. |
| 5,077,075 A | 12/1991 | Wade |
| 5,112,626 A | 5/1992 | Huang et al. |
| 5,126,156 A | 6/1992 | Jones |
| 5,175,013 A | 12/1992 | Huang et al. |
| 5,186,019 A | 2/1993 | Weyermanns et al. |
| 5,199,269 A | 4/1993 | Andersson |
| 5,438,839 A | 8/1995 | Wardle |
| 5,478,587 A | 12/1995 | Mingione |
| 5,516,537 A | 5/1996 | Fuisz |
| 5,605,712 A | 2/1997 | Bertrand et al. |
| 5,605,893 A | 2/1997 | Kaufman |
| 5,659,028 A | 8/1997 | Coussement et al. |
| 5,664,422 A | 9/1997 | Jones |
| 5,694,777 A | 12/1997 | Weyermanns |
| 5,738,889 A | 4/1998 | Bee |
| 5,783,239 A | 7/1998 | Callens et al. |
| 5,789,004 A | 8/1998 | Hogan et al. |
| 5,843,921 A | 12/1998 | Kaufman |
| 5,853,785 A | 12/1998 | Nayyar et al. |
| 5,911,741 A | 6/1999 | Weyermanns et al. |
| 5,942,264 A | 8/1999 | Monte |
| 5,955,136 A | 9/1999 | Laaman et al. |
| 5,962,060 A | 10/1999 | Farrell |
| 5,997,936 A | 12/1999 | Jimenez-Laguna |
| 6,000,229 A | 12/1999 | Jones et al. |
| 6,001,404 A | 12/1999 | Mochizuki |
| 6,017,574 A | 1/2000 | Clemmings et al. |
| 6,020,016 A | 2/2000 | Castleberry |
| 6,068,875 A | 5/2000 | Miller et al. |
| 6,168,821 B1 | 1/2001 | Castleberry |
| 6,190,718 B1 | 2/2001 | Eek et al. |
| 6,207,213 B1 | 3/2001 | Groux et al. |
| 6,209,329 B1 | 4/2001 | Jones et al. |
| 6,216,470 B1 | 4/2001 | Kosock et al. |
| 6,223,542 B1 | 5/2001 | Jones et al. |
| 6,228,415 B1 | 5/2001 | Jimenez-Laguna et al. |
| 6,287,616 B1 | 9/2001 | Beeson et al. |
| 6,290,997 B1 | 9/2001 | Villagran et al. |
| 6,308,522 B1 | 10/2001 | Jones et al. |
| 6,326,047 B1 | 12/2001 | Farrell |
| 6,339,076 B1 | 1/2002 | Kaufman |
| 6,349,549 B1 | 2/2002 | Angus et al. |
| 6,399,134 B1 | 6/2002 | Best et al. |
| 6,401,464 B2 | 6/2002 | Jones et al. |
| 6,455,091 B1 | 9/2002 | Ling et al. |
| 6,465,034 B2 | 10/2002 | Farrell |
| 6,468,576 B1 | 10/2002 | Sher et al. |
| 6,481,226 B2 | 11/2002 | Jones et al. |
| 6,494,049 B1 | 12/2002 | Jones et al. |
| D468,073 S | 1/2003 | Jones et al. |
| 6,511,693 B2 | 1/2003 | Jones |
| 6,511,694 B2 | 1/2003 | Huang et al. |
| 6,534,108 B2 | 3/2003 | Jimenez-Laguna et al. |
| 6,534,487 B1 | 3/2003 | Kaufman |
| 6,539,743 B2 | 4/2003 | Jones |
| 6,551,646 B1 | 4/2003 | Baker |
| 6,555,154 B2 | 4/2003 | Jones et al. |
| 6,560,973 B2 | 5/2003 | Jones et al. |
| 6,574,969 B1 | 6/2003 | Angus et al. |
| 6,576,285 B1 | 6/2003 | Bader et al. |
| 2001/0002269 A1 | 5/2001 | Zhao |
| 2001/0006695 A1 | 7/2001 | Jimenez-Laguna et al. |
| 2001/0041208 A1 | 11/2001 | Orris et al. |
| 2002/0122848 A1 | 9/2002 | Marchon et al. |
| 2002/0122865 A1 | 9/2002 | Boyer et al. |
| 2002/0129616 A1 | 9/2002 | Jones |
| 2002/0144608 A1 | 10/2002 | Jones et al. |
| 2002/0150664 A1 | 10/2002 | Miller et al. |
| 2002/0172749 A1 | 11/2002 | Medina et al. |
| 2002/0189268 A1 | 12/2002 | Jones et al. |
| 2002/0197376 A1 | 12/2002 | Broz |
| 2003/0003215 A1 | 1/2003 | Huang et al. |
| 2003/0044504 A1 | 3/2003 | Kataoka et al. |
| 2003/0124170 A1 | 7/2003 | Gallaher et al. |

OTHER PUBLICATIONS

"GNPD/Intense Fruit Micro-Size Ice Beads," Global New Products Database at http://www.gnpd.com/sinatra/gnpd&lang=uk/search/results&selection=pg&page0%, printed from internet on Apr. 22, 2003, 1 page.

"A Completely Different Kind of Shot," Market Trends: Hitting the Shelves at www.preparedfoods.com/archives/2002/2002_5/0502shelves.htm, printed from internet on Apr. 22, 2003, 5 pages.

Individual Product Page for "Intense Fruit Shots," at http://icecreamusa.com/products/ind_product.asp?=77567-01297, printed from internet on Apr. 22, 2003, 1 page.

"Product Handbook: Advera® Specialized, Complete Nutrition," at http://rpdcon40.ross.com/mn/Ross+MN+Nutritional+Prducts.nsf/web_Ross.com_XML/68, printed from internet on Apr. 5, 2003, 7 pages.

"Product Handbook: Ensure® Complete, Balanced Nutrition," at http://rpdcon40.ross.com/mn/Ross+MN+Nutritional+Prducts.nsf/web_Ross.com_XML/61, printed from internet on Apr. 5, 2003, 5 pages.

"Product Handbook: Forta® Shake Fortified Nutritional Supplement," at http://rpdcon40.ross.com/mn/Ross+MN+ Nutritional+Prducts.nsf/web_Ross.com_XML/02, printed from internet on Apr. 4, 2003, 4 pages.

"Product Handbook: PediaSure® Complete, Balanced Nutrition® for children," at http://rpdcon40.ross.com/mn/ Ross+MN+Nutritional+Prducts.nsf/web_Ross.com_XML/A8, printed from internet on Apr. 5, 2003, 8 pages.

"French Vanilla: A smooth,sweet, silky satisfying vanilla sensation. Cool and refreshing like vanilla ice cream on a summer's day," Slim-Fast® French Vanilla Shake at http://www.slim-fast.com/products/product_info.asp?product_id=267, printed from internet on Apr. 5, 2003, 6 pages.

Dippin' Dots, www.dippindots.com/products.html and www/dippindots.com/history.asp, 2007.

Senory Attributes and Storage Life of Reduced Fat Ice Cream as related to Inulin Content, Schaller-Povolny et al., Journal of Food Science, vol. 64, No. 3, 1999, 555-559.

PELLET SYSTEMS FOR PREPARING BEVERAGES

CROSS-REFERENCE TO RELATED APPLICATIONS

This application is a divisional of application Ser. No. 10/820,899 filed Apr. 8, 2004; and claims priority to provisional application Ser. No. 60/462,222, filed Apr. 11, 2003, incorporated by reference in its entirety herein.

TECHNICAL FIELD

This invention relates to beverages, and more particularly to methods, compositions, and articles of manufacture for preparing beverages using pellets.

BACKGROUND

Many consumers enjoy the flavor, mouth feel, and icy refreshing quality of frozen beverages, including icees, frozen cocktails, daiquiris, pina coladas, margaritas, milk shakes, frozen coffees, frozen lemonades, granitas, and slushees. In particular, children enjoy frozen beverages such as milk shakes not only as a fun treat, but also for nutritional purposes (e.g., providing calcium and protein). Consumers, and especially children, are deterred from making frozen beverages because of the effort involved in their preparation. For example, certain frozen beverages, such as milk shakes, are often prepared by thoroughly mixing a fluid, such as milk, a frozen constituent, such as ice cream, and a flavoring, such as fruit or chocolate syrup. To obtain the rich, creamy mouth feel and slushy consistency of a milk shake, a lengthy and/or cumbersome blending of the ingredients is often required. Mechanical mixers capable of mixing hardened ice cream may need to be used, and the preparer must often assemble a variety of ingredients, typically requiring an effort that an average consumer finds undesirable. For other frozen beverages, including granitas, icees, and slushees, specialized equipment, such as freezing machines, are necessary to freeze a liquid mixture in a controlled manner while mixing. Frozen beverages that have been prepared in advance for later consumption have met with resistance from the typical consumer, often because of deficiencies in flavor, mouth feel, creaminess, and overall icy refreshing quality.

SUMMARY

The invention is based on a pellet system for preparing beverages, including frozen beverages such as milk shakes. The pellet system can improve the physical properties, sensorial qualities, and stability of the prepared beverages. As the pellet system can lower the temperature of the beverage, it may be perceived as more refreshing by the consumer. In addition, the lower temperature can mask the flavors of certain nutrients or sweeteners, leading to increased consumer acceptance. The methods and systems allow beverages to be prepared without the inconvenience and expense of freezing machines or blenders. Similarly, because the pellets have a long shelf-life and are readily portable, the beverages can be prepared in a variety of locations not permitted by traditional methods using blenders or freezing machines. For example, children can enjoy frozen beverages such as milk shakes at home, at school (e.g., during lunch or snack-time), and at picnics. The pellet system described herein allows even small children to prepare their own frozen beverages in a convenient yet fun manner.

Methods, compositions, and articles of manufacture for preparing frozen beverages, including milk shakes, are disclosed herein. The methods, compositions, and articles allow frozen beverages to be rapidly prepared with minimal effort and preparation time on the part of the consumer. The frozen beverages can be useful as liquid refreshments, or for a variety of nutritional and health needs, including without limitation, for cardiovascular benefits (e.g., to lower serum cholesterol and triglycerides levels, etc.); as calcium supplements; as memory aids or stress reducers (e.g., by incorporating ingredients such as ginko bilboa or ginseng); as vehicles to increase dietary levels of healthful protein, fiber, minerals, and vitamins; for weight loss and/or gain or for meal replacement; for pediatric nutrition needs; for geriatric nutrition needs; and for the promotion of women's health (e.g., to alleviate symptoms and/or consequences of menopause; to promote bone density).

In some embodiments, the methods, compositions, and articles of manufacture use two sets of frozen pellets for preparing a frozen beverage. The pellets can be dairy or non-dairy based. Alternatively, only a first set of frozen pellets may be used. The first set of frozen pellets can include ingredients such as a milk fluid, a flavoring, a sweetener, and a stabilizer mix. A stabilizer mix can include one or more of the following: a gum, an emulsifier, and a stabilizer. A cream fluid can also be included in the first set of frozen pellets. The second set of frozen pellets can include a milk fluid, a sweetener, and a stabilizer mix. Generally, the second set of frozen pellets contains a higher percentage of a milk fluid than the first set of frozen pellets. Optional ingredients in either the first or second set of frozen pellets include buffers, acidulants, foaming agents, anti-foaming agents, cloudifiers, fiber sources, fats, proteins, colorants, and nutritive and/or health additives. Optional ingredients may also be incorporated in third frozen pellets, or provided separately, by the consumer or in the article of manufacture, for inclusion in the frozen beverage.

Articles of manufacture generally include the appropriate pellets for preparing the frozen beverage. In addition, the articles of manufacture may contain instructions for preparing frozen beverages, and can include a container for preparing the frozen beverage. An article of manufacture can include an insulated carrier for a container, such as a lunchbox. The consumer can add a desired liquid to the container and mix the pellets with the liquid to result in the frozen beverage. Typically, the consumer need only manually shake the pellets and the liquid in the container for about 10 seconds to about 2 minutes, or any value therebetween (e.g., 15, 20, 30 seconds, 45 seconds, 60 seconds, 75 seconds, 90 seconds, or 105 seconds).

The invention also provides articles of manufacture, methods, and compositions for preparing the frozen pellets of the invention. The compositions of the present invention may be mixtures of dry ingredients useful in preparing the frozen pellets, mixtures of wet ingredients useful for the same, or mixtures (dispersions) of dry and wet ingredients. Any of the compositions of the present invention may be provided as an article of manufacture. For example, the compositions may be packaged in appropriate containers (e.g., bags, buckets, cartons, tubs, pouches) for easy transport to points of sale and preparation. The article of manufacture may contain instructions for preparation of the frozen pellets of the present invention, as well as optional objects, such as utensils; containers for mixing; or optional ingredients.

The invention also provides methods for preparing the frozen pellets of the present invention. Typically, a composition containing the appropriate amounts of appropriate ingredients for the respective pellet is provided. The mixture is frozen and the pellets formed. The mixture may be frozen first, e.g., as a slab, and then cut into the appropriate size and shape pellets. Alternatively, the mixture may be frozen in appropriate size and shape molds to result in the pellets. In other embodiments, the mixture is frozen during pellet formation. For example, the pellets can be formed by allowing droplets to fall by gravity into a liquid nitrogen bath.

Accordingly, in one embodiment, the invention provides an article of manufacture for preparing a frozen beverage. The article of manufacture includes first frozen pellets having a milk fluid, a sweetener, a flavoring, and a stabilizer mix, where the milk fluid is about 25% to about 78% by weight of the first frozen pellets. The milk fluid may be whole milk. A sweetener can be any sweetener known to those of ordinary skill in the art, including nutritive and non-nutritive sweeteners. In certain cases, the sweetener can be selected from the group consisting of sugar, corn syrup, corn syrup solids, high fructose corn syrup, dextrose, maltodextrin, trehalose, acesulfame potassium, aspartame, erythritol, neotame, saccharin, high maltose syrup, sucralose, inulin, or mixtures thereof.

The article of manufacture can also provide second frozen pellets having a milk fluid, a sweetener, and a stabilizer mix, where the milk fluid is about 60% to about 85% by weight of the second frozen pellets. The milk fluid may be whole milk, and the sweetener may be a mixture of trehalose; trehalose and corn syrup; trehalose, corn syrup, and sucralose; sucralose, sugar, corn syrup, and corn syrup solids; or sucralose, corn syrup, corn syrup solids, inulin, and maltodextrin. In some embodiments, the first frozen pellets can include a cream fluid, and the combined amount of the cream fluid and the milk fluid can range from about 62% to about 90% by weight of the first frozen pellets, or from about 80% to about 87% by weight of the first frozen pellets. In certain cases, the combined amount of the cream fluid and the milk fluid can be about 84% to about 86% by weight of the first frozen pellets. The cream fluid can be heavy cream.

The first frozen pellets and second frozen pellets are, independently, pellets of relatively uniform shape and size. For example, the pellets may be in the shape of spheres, ovals, and cubes. In some embodiments, the pellets have a diameter of about 1 mm to about 20 mm, or any value therebetween (e.g., about 2, 3, 4, 5, 6, 7, 8, 9, 10, 11, 12, 13, 14, 15, 16, 17, 18, or 19 mm). In certain embodiments, the pellets have a diameter of about 4 mm to about 10 mm, or any value therebetween (e.g., about 5, 6, 7, 8, or 9 mm). In some embodiments of an article of manufacture, the first frozen pellets may be present in an amount of about 60% to about 70% by weight of the amount of the second frozen pellets.

It is another object of the invention to provide an article of manufacture comprising first and second frozen pellets and a container. The container may be for mixing the first and second frozen pellets. The container may include a cover and a straw. The first frozen pellets may be present in an amount of about 60% to about 70% by weight of the amount of the second frozen pellets. The container can contain an amount of first and/or said second frozen pellets sufficient to produce single or multiple servings of the frozen beverage.

In another aspect, the invention provides a method for making a frozen beverage including providing first frozen pellets and second frozen pellets, providing a liquid, and mixing the first frozen pellets, the second frozen pellets, and the liquid for a time sufficient to result in a substantially homogeneous frozen beverage. In some embodiments, the liquid for mixing is selected from the group consisting of water, milk, skim milk, 1% milk, 2% milk, heavy cream, light cream, half and half, soy milk, rice milk, oatmilk, fruit juice, vegetable juice, yogurt juice, and mixtures thereof. The mixing can be achieved by manual or mechanical mixing, stirring, and shaking, and occurs for a time from about 10 seconds to about 2 minutes, or any value therebetween (e.g., about 15 s, 20 s, 30 s, 45 s, 60 s, 75 s, 90 s, or 105 s). In the method, the first frozen pellets are provided at about 60% to about 70% by weight of the second frozen pellets, and the liquid is provided in an amount of about 50% to about 150% by weight of the combined weight of the first and second frozen pellets.

In another aspect, the invention provides an article of manufacture for preparing a frozen beverage including first frozen pellets. The first frozen pellets include a milk fluid, a sweetener, a flavoring, and a stabilizer mix, and the milk fluid is about 25% to about 78% by weight of the first frozen pellets. In certain cases, the milk fluid is about 60% to about 75% by weight of the first frozen pellets, or about 68% to about 72% by weight of the first frozen pellets. In some embodiments, the first frozen pellets further comprise a cream fluid, and the combined amount of the cream fluid and the milk fluid is from about 62% to about 90% by weight of the first frozen pellets. The first frozen pellets can include the sweetener at about 10% to about 25% by weight; and the stabilizer mix at about 0.15% to about 2% by weight, or any value therebetween (e.g., about 0.20%, 0.25%, 0.30%, 0.35%, 0.40%, 0.45%, 0.50%, 0.55%, 0.60%, 0.65%, 0.70%, 0.75%, 0.80%, 0.85%, 0.90%, 0.95%, 1%, 1.1%, 1.2%, 1.3%, 1.4%, 1.5%, 1.6%, 1.7%, 1.8%, or 1.9%).

In another aspect, the invention provides a method of making frozen pellets for frozen beverage preparation. The method includes providing a sweetener component, where the sweetener component includes a sweetener and a stabilizer mix; providing a fluid component, wherein the fluid component includes a milk fluid; mixing the sweetener component and the fluid component; and forming frozen pellets from the mixture.

Finally, it is also an object of the invention to provide an article of manufacture for preparing frozen pellets. The article includes a sweetener component having a sweetener and a stabilizer mix, and instructions for the preparation of frozen pellets. The instructions can indicate that frozen pellets can be prepared by mixing the sweetener component with a fluid component, such as a milk fluid and/or a cream fluid; and forming frozen pellets from the mixture.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In addition, the materials, methods, and examples are illustrative only and not intended to be limiting. All publications, patent applications, patents, and other references mentioned herein are incorporated by reference in their entirety. In case of conflict, the present specification, including definitions, will control.

The details of one or more embodiments of the invention are set forth in the accompanying drawings and the description below. Other features, objects, and advantages of the invention will be apparent from the drawings and detailed description, and from the claims.

DETAILED DESCRIPTION

In general, the invention provides methods and articles of manufacture for preparing beverages, including frozen beverages, such as milk shakes. As used herein, a "frozen beverage" means a beverage, typically at a temperature range (upon preparation) of from about 5° F. to about 40° F., or from about 28° F. to about 36° F. The frozen beverage is typically capable of flowing under conditions of low to moderate shear stress. A frozen beverage can have a viscosity (upon preparation) of from about 100 to about 150 centapoise, e.g., from about 110 to 115 centapoise or from about 120 to about 135 centapoise in certain embodiments.

As described herein, frozen pellets containing milk, sweetener, and a stabilizer mix can be used to rapidly prepare frozen beverages, such as milk shakes or creamy fruit beverages. In certain cases, frozen pellets can contain milk, cream, a mixture of one or more sweeteners including inulin, and a stabilizer mix. A liquid is added to the frozen pellets, and after shaking, a frozen beverage is produced. Thickness of the beverage can be adjusted to consumer preference, by, for example, adding more liquid. Thus, beverages can be prepared that can be drunk (with or without a straw) or consumed with a spoon. In some embodiments, the methods and articles employ two sets of frozen pellets. In other embodiments, one set of frozen pellets is mixed with the appropriate liquid to result in the frozen beverage.

Frozen Pellets

The methods and articles described herein can employ a first set of frozen pellets, or first and second sets of frozen pellets, referred to herein as first frozen pellets and second frozen pellets.

The frozen pellets have a shape, size, volume, and surface area to allow efficient pellet break down upon manual mixing with an added liquid. Typically mixing is complete within 10 seconds to 2 minutes, or any value therebetween (e.g., about 15, 20, 30, 45, 60, 75, 90, or 105 seconds). The first and second frozen pellets may have, independently, any shape, size, volume, surface area, and color. For example, the pellets may be spheres, ovals, cubes, cylinders, rectangles, diamonds, or other novelty shapes (e.g., flowers, stars, faces), or mixtures of various shapes. Generally, the first frozen pellets and second frozen pellets are, independently, of relatively uniform size and shape. For example, the first frozen pellets may be spheres of a particular size, while the second frozen pellets may be cubes of a different size. Alternatively, the first and second frozen pellets may both be spheres of the same size. Typically, the frozen pellets may have a diameter of from about 1 mm to about 20 mm, or any value therebetween (e.g., about 2, 3, 4, 5, 6, 7, 8, 9, 10, 11, 12, 13, 14, 15, 16, 17, 18, or 19 mm). In certain embodiments, a pellet can have a diameter of from about 4 mm to about 10 mm. The first and second pellets may be the same color (e.g., first and second frozen pellets are white) or two different colors (e.g., first frozen pellets are white, while second frozen pellets are blue), or the pellets may be, independently, a mixture of colors (e.g., first frozen pellets are red and yellow; second frozen pellets are white and yellow).

The first frozen pellets or a combination of the first and second frozen pellets can be used to prepare frozen beverages. Thus, first frozen pellets may be used to prepare frozen beverages in two ways: 1) first frozen pellets may be mixed with an appropriate liquid to result in a frozen beverage; or 2) first frozen pellets may be combined with (e.g., mixed with) second frozen pellets and an appropriate liquid to result in a frozen beverage. Depending on the method chosen, the formulation and amount of first frozen pellets and the amount of liquid used to prepare the frozen beverage may vary, as discussed below.

First frozen pellets generally contribute to the creamy mouth feel and flavor of the frozen beverage. The first frozen pellets include a milk fluid, a sweetener, a flavoring, and a stabilizer mix. A cream fluid is also typically included in the first frozen pellets. In certain cases, a sweetener included in the first frozen pellets can include inulin and/or other fructo-oligosaccharides. Optional ingredients include buffers, fats, oils, proteins, colorants, acidulants, foaming agents, anti-foaming agents, cloudifiers, fiber sources, preservatives, antioxidants, masking agents, and nutritive additives.

Second frozen pellets can contribute to the icy slushy texture of the frozen beverages described herein. While not being bound by any theory, it is believed that the second frozen pellets have an ice crystal formation that is suitable for relatively easy break up upon mixing with the first frozen pellets and the added liquid. The second frozen pellets generally include a milk fluid, a sweetener, and a stabilizer mix. Optional ingredients as indicated above are also contemplated.

In certain embodiments, a first frozen pellet may be the only pellet needed. For example, in certain cases, a first frozen pellet can include a milk fluid, a cream fluid, a stabilizer mix, a sweetener including one or more fructo-oligosaccharides such as inulin, and a flavoring.

Preparation of Frozen Pellets

To prepare the first or second frozen pellets, the ingredients are generally mixed in the appropriate amounts and heated, if necessary, to aid dispersion and solubilization of the ingredients (e.g., heated to from about 150° F. to about 190° F., such as about 185° F.). The mixture may be homogenized and/or treated with shear force. The mixture can be pasteurized, e.g., by FDA-approved methods, in continuous flow, multi-stage, or batch methods. If necessary, after pasteurization and/or homogenization, the mixture may be cooled, e.g., cooled to a temperature from between about 2° C. to about 20° C., such as about 4° C. to about 12.5° C. The cooled mixture can remain at the cooled temperature for an aging period, e.g., about 4 hours to about 24 hours. Aging may contribute to a favorable and homogeneous distribution of a stabilizer mix. Flavorings and/or sweeteners may be added prior to heating, after heating, or after cooling, particularly if the flavorings or sweeteners are volatile or heat-sensitive. Whipping or incorporating air into the mixture can increase the volume or overrun; however, overrun may not lead to optimal pellet quality upon freezing, and thus incorporating air to result in overrun is preferably avoided. Prior to freezing, the mixture can exhibit minimal overrun, e.g., less than about 102% overrun, or less than about 100% overrun. Overrun can be calculated by subtracting the weight of a mixture having air incorporated (e.g., by whipping) from the weight of the non-air-incorporated mixture, dividing by the weight of the air-incorporated mixture, and multiplying by 100.

The mixture can then be frozen. For example, the mixture can be frozen in appropriate molds to result in the desired shape and/or size of the pellets, or can be frozen, e.g., as a slab, and then cut into the appropriate shape and size. The mixture may be frozen by exposure to dry ice or liquid nitrogen or with the use of a freezer. In some embodiments, the mixture is frozen during pellet formation. For example, spherical pellets can be formed by allowing the mixture to drop (e.g., by gravity or positive pressure) into a source of liquid nitrogen. See also, e.g., methods disclosed in U.S. Pat. Nos. 5,126,156; 5,664,422; and 6,000,229. In certain embodiments, a freezer, e.g., a Frigoscandia Equipment FloFreeze® Individual Quick Freezer (IQF) may be used to prepare the frozen pellets (Frigoscandia Equipment, FMC Corp.). Alternatively, pellets could be sprayed to build up successive layers of various ingredients including water.

After freezing, the pellets can be coated. Coatings can aid in the free flow of the pellets relative to one another and/or a container, and can optionally contribute flavors, colors, or stability to the pellets. For example, a coating can be a carbohydrate, such as a cold swelling starch; a sweetener such as trehalose or sucralose; a defoamer, such as a mixture of 2% SAG 100 and 1% sodium citrate; a protein, such as sodium caseinate, or a fat.

After freezing, pellets can be hardened or tempered, at about –10° C. to about –30° C. (e.g., about –20° C.). Hardening or tempering can take place for any period of time, e.g. about 1 hr. to about 1 week, or longer. Aging and/or tempering can bring the pellets into a more stable condition vis à vis temperature fluctuations during distribution (e.g., favorable melting rate, favorable melting temperature).

The milk fluids for inclusion in the first or second frozen pellets include whole milk, skim milk, 1% milk, 2% milk, condensed milk, non-fat milk, soy milk, ricemilk, oatmilk, buttermilk, and mixtures thereof. Reconstituted powdered milk may also be used. The milk fluid may be lactose-free. In some embodiments, whole milk is used as the milk fluid for first and/or the second frozen pellets.

Generally the milk fluid is about 25% to about 78% by weight of the first frozen pellets. As used herein, percentages by weight reflect the percentage of the appropriate ingredient in the mixture prior to freezing. For example, the milk fluid can be about 50% to about 60%, about 65% to about 75%, or about 38% to about 50% by weight of the first frozen pellets. In certain cases, the milk fluid is from about 68% to about 72% by weight of the first frozen pellets, or any value therebetween (e.g., about 69, 70, or 71%). Typically, the milk fluid is about 60% to about 85%, or about 80% to about 85% by weight of the second frozen pellets.

The cream fluid for inclusion in the first frozen pellets can have a fat content ranging from approximately 15% to 45%, including, for example, heavy cream, light cream, regular cream, and half and half. Reconstituted dry cream can also be used. The cream fluid may be lactose-free. The cream fluid generally contributes to the rich, creamy taste and mouth feel of the frozen beverages, e.g., milk shakes, of the present invention. In one embodiment, heavy cream (40% fat content) is used in the first frozen pellets.

The combined amount of the milk fluid and the cream fluid in the first frozen pellets can range from about 62% to about 92% by weight, or from about 80% to about 87% by weight. In other embodiments, the combined amount of the milk fluid and the cream fluid in the first frozen pellets can range from about 62% to about 78%, from about 68% to about 72%, or from about 82% to about 86% by weight. Typically, the total amount of milkfat in first or second frozen pellets ranges from about 4% to about 10%, or any value therebetween (e.g., about 5, 6, 7, 8, or 9%).

A stabilizer mix generally contributes to the rich mouth feel, body, viscosity, and stability of the frozen beverage. A stabilizer mix can include one or more of the following: a gum, an emulsifer, and a stabilizer. A stabilizer mix is generally provided in a range from about 0.15% to about 2% by weight of the first frozen pellets (e.g., about 0.20%, 0.25%, 0.30%, 0.35%, 0.40%, 0.45%, 0.50%, 0.55%, 0.60%, 0.65%, 0.70%, 0.75%, 0.80%, 0.85%, 0.90%, 0.95%, 1%, 1.1%, 1.2%, 1.3%, 1.4%, 1.5%, 1.6%, 1.7%, 1.8%, or 1.9%), and from about 0.2% to about 0.6% by weight of the second frozen pellets. In some embodiments, the stabilizer mix is provided in a range of from about 0.1% to about 0.4% by weight of the first frozen pellets (e.g., about 0.3%), and in a range of from about 0.3% to about 0.5% by weight of the second frozen pellets. In other embodiments, a stabilizer mix for first frozen pellets can be provided in a range of from about 0.6 to about 1%, or from about 1% to about 1.4% by weight. A stabilizer mix for use in the present invention can be commercially available (e.g., Daritech FR 102 (Degussa), which includes guar gum, carrageenan, and mono- and di-glycerides; this stabilizer mix is standardized with dextrose. In other cases, a stabilizer mix can be prepared by including the appropriate gum, emulsifer, and/or stabilizer, e.g., either by mixing prior to addition to the other pellet ingredients or during mixing with the other pellet ingredients.

Gums for inclusion in a stabilizer mix can be selected to enhance the physical stability of the frozen beverage, e.g., from cream separation, whey separation, phase separation, syneresis, and protein coagulation. For example, gums can help emulsify fat and trap whey proteins, and provide suspension, viscosity, and body to the resultant frozen beverage. Gums included in the stabilizer mix for second frozen pellets also can contribute to the slushy quality of the frozen beverage by enhancing easy break up of the ice crystal formation in the second frozen pellets upon mixing with the added liquid.

Typical gums include carageenans, alginates, xanthan gum, cellulose gel, locust bean gum, gum tragacanth, gum karaya, gum arabic, gum ghatti, gelatin, pectin, guar gum, and tara gum, or mixtures thereof. In some embodiments, carageenans, carageenan and guar gum, or carageenanas and gelatin, can be used in the stabilizer mix of the first frozen pellets. Carageenan refers to a family of food grade polysaccharides obtained from red seaweeds. Carageenans for use in the present invention can include kappa, lambda, and iota carageenans, or any mixture thereof. Carageenans may be particularly useful for frozen beverages containing dairy products or fluids. In certain embodiments, gelatin is used alone, or in combination with carageenans, in the second frozen pellets. Blends of gums may be useful for frozen beverages comprising fruit juices or concentrates. Gums, including carageenans, are available from FMC (Princeton, N.J.); and Rousselot (DuBuque, Iowa).

Emulsifiers included in a stabilizer mix can help emulsify fats and contribute to the stability, consistency, and mouth feel of the frozen beverage. Food grade emulsifiers are generally known in the art. Nonlimiting typical examples of emulsifiers include distilled monoglycerides, mono- and diglycerides, diacetyl tartaric acid esters of mono- and diglycerides (DATEM), lecithin, emulsifying starches (e.g., octenylsuccinate anhydride starch), tapioca starches, cold swelling starches, modified lecithin, polysorbate 60 or 80, sodium stearyl lactylate, propylene glycol monostearate, succinylated mono- and diglycerides, acetylated mono- and diglycerides, propylene glycol mono- and diesters of fatty acids, polyglycerol esters of fatty acids, lactylic esters of fatty acids, glyceryl monosterate, propylene glycol monopalmitate, glycerol lactopalmitate and glycerol lactostearate, and mixtures thereof. Emulsifiers are available commercially through, e.g., FMC Biopolymer (Philadelphia, Pa.), Central Soya (Fort Wayne, Ind.), Danisco (Copenhagen, Denmark); CPKelco (San Diego, Calif.), TIC (Belcamp, Md.).

Stabilizers included in a stabilizer mix can contribute to texture, mouth feel, and ice crystal size control. Stabilizers suitable for inclusion in food products are commercially available and known in the art. Typical examples include cellulose; gelling agents; whipping agents, e.g., soy whipping agents; and antioxidants.

The first and second frozen pellets also include a sweetener. Sweeteners can contribute to the flavor and sweetness of the frozen beverages, as well as function as bulking, stability, and melting point depressants. The amount of sweetener used will vary with, e.g., the flavoring used, consumer preference, caloric content desired, etc. Generally, the sweetener is included in an amount from about 10% to about 25% by weight of the first frozen pellets, or from about 12% to about 15%. For second frozen pellets, the sweetener is typically included in an amount from about 10% to about 20%, or from about 14% to about 17% by weight.

The sweetener can be nutritive or nonnutritive. Examples of sweeteners for use in the present invention include sugar, trehalose, sucrose, sucralose, maltodextrin, corn syrup, corn syrup solids, high maltose syrups, sugar solids, fructose, lactose, dextrose, fructo-oligosaccharides such as inulin, acesulfame potassium, neotame, saccharin, aspartame, high fructose corn syrup, sorbitol, mannitol, xylitol, erythritol, maltitol, isomaltitol, lactitol, and mixtures thereof.

Trehalose is a unique, naturally occurring disaccharide containing two glucose molecules bound in an $\alpha$, $\alpha$-1, 1 linkage. This structure results in a chemically stable, non-reducing sugar. While not being bound by any theory, trehalose is believed to contribute to desirable freeze-thaw properties of the frozen beverages. Trehalose is 45% as sweet as sucrose when compared to a 10% sucrose solution. In addition, the taste profile is nicely balanced, and the mild sweetness of trehalose can allow other flavors in the frozen beverages to be enhanced.

Sucralose is a high-intensity sugar substitute, which is sold under the name Splenda™. It is non-caloric and about 600 times sweeter than sucrose (white table sugar), although it can vary from 320 to 1,000 times sweeter, depending on the food application. The white crystalline powder tastes like sugar, but is more intense in its sweetness. Other high intensity sugar substitutes include aspartame, saccharin, acesulfame potassium, and neotame.

Fructo-oligosaccharide fibers, such as inulin, belong to the fructan group of oligo- and polysaccharides. They are composed of linear chains of fructose units linked by $\beta$ 2-1 bonds and are generally terminated by a glucose unit. Fructo-oligosaccharides may promote the growth of beneficial *Bifidobacteria* in the lower gut and may help increase the absorption of dietary calcium. While not being bound by any theory, the addition of inulin and/or fructo-oligosaccharide fibers may improve beverage stability, slow melting, and improve the mouthfeel, flavor retention, and creaminess of a frozen beverage.

Maltodextrins are mixtures of glucose polymers produced by the controlled depolymerization of corn starch. They are most often categorized by dextrose equivalence, which is a measure of reducing power as compared to a dextrose standard of 100.

In some embodiments of the first or second frozen pellets, trehalose, or a combination of trehalose and sucralose, or a mixture of trehalose, corn syrup, and sucralose, are used as a sweetener. In other embodiments, maltodextrin, or a combination of maltodextrin and sugar solids (e.g., sucrose), or a combination of maltodextrin, sugar solids, and sucralose are used. In yet other embodiments, a mixture of sucralose, sugar, corn syrup and corn syrup solids are used, or a mixture of sucralose, corn syrup solids, corn syrup, inulin, and maltodextrin are used. Sweeteners are commercially available, e.g., through Cargill Inc. (Wayzata, Minn.) and McNeil Specialty (Fort Washington, Pa.).

First frozen pellets also include one or more flavorings. The flavoring can be artificial or natural. The amount of the flavoring will depend on the flavoring itself, sweetener content, and consumer preference. Generally the flavoring will be present in an amount of from about 0.1% to about 2% by weight of the first frozen pellets. Suitable flavorings include citrus and non-citrus fruit flavors; spices; herbs; botanicals; chocolate, cocoa, or chocolate liquor; coffee; flavorings obtained from vanilla beans; nut extracts; liqueurs and liqueur extracts; fruit brandy distillates; aromatic chemicals, imitation flavors; and concentrates, extracts, or essences of any of the same. For example, pure vanilla or ethyl vanillin may be used, or a combination of the two, to prepare a vanilla milkshake. Flavorings may also be optionally included in second frozen pellets, typically in the same range as for the first frozen pellets. Flavorings are available commercially from, e.g., Rhodia USA (Cranbury, N.J.); IFF (South Brunswick, N.J.); Wild Flavors, Inc. (Erlanger, Ky.); Silesia Flavors, Inc. (Hoffman Estates, Ill.), Chr. Hansen (Milkwaukee, Wis.), and Firmenisch (Princeton, N.J.).

Additional optional ingredients may also be incorporated into the first or second frozen pellets as needed or desired to result in a frozen beverage of a particular mouth feel, creaminess, stability, and consistency. Examples of optional ingredients for inclusion in a frozen beverage are generally known in the art and include buffers, fats, fiber sources, cloudifiers, proteins, colorants, masking agents, preservatives, acidulants, foaming agents, antifoaming agents, and nutritive additives.

Buffers to adjust the pH of the frozen beverage can also be included in the first or second frozen pellets. Typically, beverages can have a pH of about 2.0 to 6.9. For example, the pH of a milk shake can range from about 6.5 to about 7.2, or from about 6.6 to about 6.9. Other frozen beverages can have lower pHs. Buffers should be food grade. Typical buffers include orthophosphate buffers such as sodium phosphate, potassium phosphate. Other buffers include sodium citrate and potassium citrate. The buffer should be included in an amount to achieve the desired pH of the frozen beverage, and will depend on the end product and the liquid selected (e.g., juice vs. milk).

Food grade natural or artificial colorants may optionally be included in the frozen pellets. These colorants may be selected from those generally known and available in the art, including synthetic colors (e.g., azo dyes, triphenylmethanes, xanthenes, quinines, and indigoids), caramel color, titanium dioxide, red #3, red #40, blue #1, and yellow #5. Natural coloring agents such as beet juice (beetred), carmine, curcumin, lutein, carrot juice, berry juices, spice extractives (turmeric, annatto and/or paprika), and carotenoids may also be used. The type and amount of colorant selected will depend on the end product and consumer preference. For example, vanilla frozen beverages can range from a white or cream color to a more yellow color. The amount of colorant, if used, will typically range from about 0.005% to about 0.01% by weight of the frozen pellets. Colorants are available from, e.g., Wild Flavors, Inc. (Erlanger, Ky.), McCormick Flavors (Hunt Valley, Md.), CHR Hansen (Milwaukee, Wis.), RFI Ingredients (Blauvelt, N.Y.), and Warner-Jenkinson (St. Louis, Mo.).

Fats may also optionally be included in the first or second frozen pellets. As used herein, "fat" includes both liquid oils and solid or semi-solid fats. Fats can contribute to a creamy feeling on the tongue and impart melt resistance to the frozen beverage. Suitable fats include, without limitation, partially or fully hydrogenated vegetable oils such as cotton seed oil, soybean oil, corn oil, sunflower oil, palm oil, canola oil, palm kernel oil, peanut oil, MCT oil, rice oil, safflower oil, coconut oil, rape seed oil, and their mid- and high-oleic counterparts; or any combination thereof. Animal fats such as butter fat may also be used. The amount of fat included will depend on the end-product, but generally ranges from about 0% to about 20% by weight of the frozen pellets, or from about 0% to about 10%. Fats and oils are available commercially from, e.g., Cargill, Inc. (Wayzata, Minn.), Fuji Vegetable Oil (White Plains, N.Y.), ADM (Decatur, Ill.), and Loders-Croklaan (Channahon, Ill.).

Fiber sources can also be optionally included in first or second frozen pellets. Both soluble and insoluble fiber sources can be used to increase total dietary fiber content; to add mouthfeel, texture, and body; to stabilize a pellet system; to enhance flavor; and to replace fat (e.g. as a fat mimetic). Examples of fiber sources include arabinogalactan, pectin, beta glucan, inulin, fructooligosaccharides, maltodextrin, resistant starch, psyllium, CMC, microcrystalline cellulose, alginate, gum Arabic, partially hydrolyzed guar gum, locust bean gum, carrageenan, xanthan gum, and oat fibers. The amount of fiber source will vary depending on the desired properties in the end-product, but typically can range from about 0.1% to about 10% by weight of a frozen pellet, or any value therebetween (about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5% by weight). In certain cases, a fiber source can range from about 1% to about 4% by weight of a frozen pellet.

Proteins or peptides can be included in the frozen pellets, e.g., for nutritive purposes and/or for their contribution to the consistency, whipping property, smoothness, mouth feel, and stability of the frozen beverages. Typical proteins include caseins, soy proteins (e.g., soy protein isolate or hydrolysate), albumin, non-fat milk solids, milk proteins, whey protein, rice protein, wheat protein, oat protein, and mixtures thereof. Protein hydrolysates may also be used. See, e.g., U.S. Pat. Nos. 5,024,849 and 6,287,616. The protein may be supplied as is, or may be a component of, e.g., the milk or cream fluids described previously. Proteins are available from, e.g., New Zealand Milk Products (Lemoyne, Pa.); Land O'Lakes (St. Paul, Minn.); Cargill, Inc. (Wayzata, Minn.); and Dupont Protein Technologies (St. Paul, Minn.).

Preservatives can be included as some ingredients tend to react and change over time. Examples include potassium sorbate, calcium sorbate, and sodium benzoate. Masking agents can be included to mask artificial sweeteners or off-flavors, such as grassy, beany, or chalky flavors found in some nutritional ingredients. Acidulants can provide sharpness and bite, and also contribute to preservation. Citric, malic, fumaric, ascorbic, lactic, phosphoric, and tartaric acid can be used as acidulants. Acidulants are available from Cargill, Inc. (Wayzata, Minn.) and ADM (Decatur, Ill.).

Frozen pellets may also contain one or more nutritive and/or health additives, e.g., to promote weight gain or loss, cardiovascular health, pediatric health, geriatric health, women's health, etc. Suitable examples of nutritive and/or health additives, include proteins (e.g., as described above); fats; carbohydrates; triglycerides; fiber (e.g., soy fiber); amino acids (e.g., histidine, isoleucine, leucine, lysine, methionine, phenylalanine, threonine, tryptophan, valine, alanine, arginine, aspartic acid, cystine, glutamic acid, glycine, proline, serine, tyrosine); L-carnitine, taurine, m-inositol; nucleic acids; fatty acids (omega-3 fatty acids, such as EPA and DHA; polyunsaturated, monounsaturated, and saturated fatty acids, such as linolenic acid, alpha-linolenic, caprylic acid, capric acid, lauric acid, myristic acid, palmitic acid, stearic acid, oleic acid, and arachidic acid); plant phytosterols and plant phytostanols; isoflavones (e.g., daidzein, genistein, glycitein, daidzin, genistin, glycitin, 6"-O-acetyldaidzin, 6"-O-acetylgenistin, 6"-O-acetylglycitin, 6"-O-malonyldaidzin, 6"-O-malonylgenistin, and 6"-O-malonylglycitin); green tea extracts; vitamins (e.g., vitamins A, D, E, K, C, folic acid, thiamin, riboflavin, vitamins B6 and B12, niacin, choline, biotin, panthothenic acid); beta-carotene; phylloquinone; niacinamide; minerals (sodium, potassium, chloride, calcium, phosphorus, magnesium, iodine, manganese, copper, zinc, iron, selenium, chromium, molybdenum); glucosamine sulfate; chondroitin sulfate; hyaluronic acid; s-adenosyl methionine; milk thistle; dandelion, burdock, ginseng, ginger, ginko bilboa, caffeine, guarana, inulin, zeaxanthin, rosmarinic acid, lycopene, lutein, grape extracts, flax seed, and salts, including salts of the compounds described previously; and derivatives of the compounds described previously. Vitamins and minerals are available from e.g., Roche Vitamins, Inc. (Parsippany, N.J.); phytonutrients and carbohydrates are available from Cargill, Inc. (Wayzata, Minn.).

Methods of Preparing Frozen Beverages

To prepare frozen beverages, the first frozen pellets, or first and second frozen pellets, are provided in the appropriate amount and mixed with a liquid for a time sufficient to result in a substantially homogeneous frozen beverage. By "substantially homogeneous" it is meant that the frozen beverage does not exhibit significantly undissolved first and/or second frozen pellets, and a drinkable beverage product is obtained. For example, preferably the frozen beverage has less than 40% of the volume of any individual pellet remaining after mixing, or less than 20%, or less than 10%, or less than 5%. If first and second frozen pellets are used to prepare a frozen beverage, first frozen pellets are usually provided in an amount from about 60% to about 70% by weight of the second frozen pellets. Mixing can be achieved by manual means, such as by shaking, stirring, or blending (e.g., by hand shaking in a shaker or by stirring or blending with a utensil such as a whisk or a spoon). Typically, the frozen beverage can be prepared by manually shaking the first frozen pellets, or first and second frozen pellets, with the liquid in an appropriate container. Generally, the mixing occurs for a time from about 10 seconds to about 2 minutes, or any value therebetween, e.g., from about 10 seconds to about 20 seconds, or from about 25 seconds to 1 minute. In some embodiments, mixing is complete in about 30 seconds. Alternatively, handheld immersion blenders, upright blenders, and mechanical shakers are also suitable methods for mixing.

During mixing of the frozen pellets with the liquid, the pellets lose their pellet shape and size and a substantially homogeneous fluid frozen beverage is obtained. As described previously, a fluid beverage is capable of flowing under low or moderate shear stress, although it need not flow under conditions of no shear stress. Thus, the frozen beverages of the present invention may exhibit a relatively thick, nonflowing property while standing, but can be drunk through a straw, an example of a low shear stress.

Typical examples of mixing liquids include, without limitation, water, tea (e.g., green tea; chai tea), coffee, cocoa, whole milk, skim milk, 1% milk, 2% milk, chocolate milk, nonfat milk, heavy cream, light cream, regular cream, half and half, soy milk, rice milk, oatmilk, alcoholic beverages, carbonated and uncarbonated beverages, buttermilk, juices (e.g., citrus and non-citrus fruit juices or vegetable juices), yogurt juice, and mixtures thereof. In some embodiments, fruit juices or juice concentrates from orange, grapefruit, raspberry, cranberry, blackberry, apple, pear, lemon, mango, lime, peach, plum, strawberry, cherry, or blueberry fruits, or vegetable juices or juice concentrates from tomato, carrot, green pepper, grasses, or herbs can be used as a mixing liquid or in combination with another mixing liquid such as milk. Depending on the liquid chosen, a variety of beverages will result. For example, use of coffee can result in a frozen cappuccino-type product, while a fruit juice or fruit juice concentrate can produce a fruit smoothie type-product. Carbonated beverages such as root beer can produce a float-type product.

The liquid can be provided in an article of manufacture containing the frozen pellets, e.g., in an appropriate amount for mixing, or can be provided by the consumer. For example, an article of manufacture can include a container containing therein the appropriate liquid, e.g., a juice box or bag or a milk carton. Typically the liquid is provided at a temperature from about room temperature to about 40° F.

If first frozen pellets are used, the first frozen pellets are provided in an amount of from about 50% to about 125% by weight of the liquid, or any value therebetween (e.g., about 60%, 70%, 80%, 90%, 100%, 110%, or 120%). In certain embodiments, first frozen pellets can be provided from about 60% to about 70% by weight of the liquid. For example, 80 g of first frozen pellets may be mixed with 120 g of liquid. In other embodiments, the first frozen pellets and the liquid are provided in equal amounts. For example, 100 g of first frozen pellets may be mixed with 100 g of the liquid. In embodiments employing first and second frozen pellets, the liquid is generally provided in an amount of from about 50% to about 150% by weight of the combined weight of the first and second frozen pellets. In certain embodiments, the liquid is provided in an amount from about 70% to about 90% by weight of the combined weight of the first and second frozen pellets. For example, 50 g of first frozen pellets, 75 g of second frozen pellets, and 100 g of liquid may be mixed to result in a frozen beverage. As one of skill in the art will recognize, the consumer may adjust the amounts of the liquid to result in a thinner or thicker consistency beverage as desired.

The container for mixing can be made of ingredients such as plastic, metal, or glass. Typically, the container is an appropriate size and shape to promote efficient mixing of the pellets with the liquid. For example, the container should have an appropriate head space above the pellets and liquid for efficient mixing. Thus, the container may incorporate a head space of about 20% to about 150% of the combined volume of the first and second frozen pellets and the liquid. In addition, the container may be appropriately contoured and/or contain internal projections to promote mixing.

The container may include a cover, and the cover may include an opening for, e.g., a straw or spoon. In one embodiment, a shaker (e.g., a shaker similar to a martini shaker) is used as the container. The container may have one or more lines to indicate single and/or multiple serving size fill points for the pellets and/or liquid. A container can have a positive closure so that minimal spillage occurs during shaking. A container can have freeze-thaw resilience and durability. In some cases, a container may provide increased insulation of the pellets. For example, a foam label may provide increased protection from freeze-thaw cycles in the distribution chain. A container can contain therein an appropriate amount (e.g., single or multiple serving) of the frozen pellets. The consumer can then add the desired liquid and mix the pellets with the liquid to result in the frozen beverage.

The method can also include providing flavoring particulates, such as fruit (e.g., bananas, strawberries, blueberries, peaches, pears, plums, cherries, blackberries, apples, oranges) and/or confections (candy, cookies, cake, sprinkles, chocolate flakes, etc.). The flavoring particulates can vary in size, and can in some case be whole fruit (e.g., blueberries) or whole candies (e.g., M&M's®). The flavoring particulates can be provided prior to mixing of the frozen pellets with the liquid. For example, fruit particulates, such as minced strawberries, may be added to the frozen pellets in the container. After addition of the liquid and appropriate mixing, a frozen beverage with the fruit particulates distributed throughout is obtained. Alternatively, the flavoring particulates may be provided after mixing of the frozen pellets with the liquid. For example, cookie bits may be sprinkled on top of the resultant frozen beverage. The flavoring particulates may be included in an article of manufacture containing frozen pellets or can be provided by the consumer.

Similarly, the method can also include providing nutritive and/or health additives. Suitable nutritive and health additives are described above. The nutritive and/or health additives can be provided prior to mixing. For example, soy protein isolate can be added to the frozen pellets in the container, and after adding liquid and mixing, a frozen beverage containing soy protein isolate is obtained. Alternatively, the nutritive and/or health additives may be added after mixing of the pellets with the liquid, such as by sprinkling on top of the frozen beverage or by mixing into the frozen beverage with a spoon.

In certain embodiments, flavoring particulates or nutritive/health additives may be provided as third frozen pellets. For example, fruit or candy may be frozen and formed into third frozen pellets. The third frozen pellets may optionally include a milk fluid, a gum, and a sweetener. If a milk fluid, gum, or sweetener is included, the third frozen pellets will typically include the ingredient in similar proportions to the second frozen pellets.

Articles of Manufacture for Preparing Frozen Beverages

The invention provides articles of manufacture for preparing frozen beverages. Articles of manufacture generally include the appropriate pellets for preparing the frozen beverage. If first and second frozen pellets are used, first frozen pellets can be provided in an amount from about 60% to about 70% by weight of the second frozen pellets. The pellets can be included "as is" inside the container. For example, if first and second pellets are used, the container may contain a mixture of both pellets. Alternatively, the pellets may be packaged. For example, the pellets may be in foil or plastic bags, pouches, or cups. The packaging may be vacuum-sealed or not. The pellet packages may be present inside a container, in an article alongside a container, or provided separately from the container. The article of manufacture can include an amount of the frozen pellets to prepare single or multiple servings of the frozen beverage. A single serving of a frozen beverage will typically range from about 200 ml to about 400 ml. Multiple servings may be some multiple (e.g., 2×, 3×, 4×) of the single serving.

The articles of manufacture can include a container, as described above, for preparing the frozen beverage. In addition, the articles of manufacture can contain instructions for preparing frozen beverages. Typically, the instructions indicate that the preparer can mix the frozen pellets with an appropriate amount of a liquid for a time sufficient to result in the frozen beverage. Finally, the article of manufacture can include additional items, e.g., utensils, such as spoons or straws; the liquid for mixing; optional ingredients, as described previously; flavoring particulates; or third frozen pellets.

Compositions, Methods, and Articles of Manufacture to Prepare Frozen Pellets

The invention also provides articles of manufacture, methods, and compositions for preparing the frozen pellets of the invention. Generally, prior to freezing, the frozen pellets are a liquid dispersion of dry ingredients in wet ingredients. Accordingly, compositions of the present invention may be mixtures of dry ingredients useful in preparing the frozen pellets, mixtures of wet ingredients useful for the same, or liquid mixtures (dispersions) of dry and wet ingredients. For example, a composition of the present invention may include a milk fluid at about 25% to about 78% by weight and a cream fluid at about 12% to about 55%, provided that the combined amount of the milk fluid and cream fluid ranges from about 62% to 90% by weight. The composition may further include a sweetener from about 10% to about 25% by weight, and/or a stabilizer mix at about 0.15% to about 2% by weight.

Another composition of the present invention may include a milk fluid at about 60% to about 80% by weight. A sweetener may be included, at about 10% to about 20% by weight, as well as a stabilizer mix at about 0.2% to about 0.6% by weight. Other optional ingredients in either composition include flavorings, buffers, fiber sources, emulsifiers, fats, oil, stabilizers, proteins, colorants, and nutritive additives.

As one of skill in the art will recognize, other compositions useful in the present invention may be mixtures of ingredients that, upon mixing with an appropriate fluid (e.g., a milk fluid), yield a liquid mixture for preparing the first or second frozen pellets. For example, a composition of the present invention can contain a mixture of a sweetener and a stabilizer mix. Such a composition is referred to herein as a sweetener component. Flavorings may optionally be included in the sweetener component, as well as other optional ingredients, as discussed previously. In certain embodiments, the sweetener component may be a dry mixture, while in other embodiments the sweetener component may be a paste, a gel, or a liquid.

The relative amounts of the ingredients in the sweetener component can vary depending on the amount of other ingredients (e.g., fluid components such as milk fluids) to be added when preparing the first or second frozen pellets. The fluid component for mixing with the sweetener component may include a milk fluid, and may further include a cream fluid and/or a flavoring.

Frozen pellets can be formed from the mixture of the sweetener component and the fluid component using the methods described above. The frozen pellets may then be packaged in a container.

Any of the compositions of the present invention may be provided as an article of manufacture. For example, the compositions, including a sweetener component, may be packaged in appropriate containers (e.g., drums, pouches, tubs, totes, bags, buckets, cartons) for easy transport to points of sale and preparation and for easy pouring and/or mixing. The article of manufacture may contain optional objects, such as utensils; containers for mixing; or other optional ingredients.

The articles of manufacture can include instructions for preparing frozen pellets. Such instructions can indicate that frozen pellets can be prepared by mixing the sweetener component with a fluid component and forming frozen pellets from the mixture. For example, the instructions can indicate that the sweetener component, or some portion thereof, can be mixed with appropriate amounts of one or more liquids, e.g., cream and milk, heated to disperse the dry ingredients, cooled, and flavorings and/or sweeteners added, if necessary, and in appropriate amounts. In general, depending on the type of pellet to be prepared, the instructions can direct the preparation of a liquid mixture having the appropriate ranges by weight, as discussed previously, of a milk fluid and/or cream fluid, sweetener, stabilizer mix, and/or flavorings. For example, an article of manufacture, useful for the preparation of first frozen pellets, can include instructions indicating that one can mix a sweetener component with a total amount of liquid to yield a mixture having a milk fluid at about 25% to about 78% by weight, a sweetener at about 10% to about 25% by weight, and a stabilizer mix at about 0.15% to about 2% by weight. In addition, the instructions can indicate that the liquid mixture may include a combined amount of milk fluid and cream fluid of about 62% to about 90% by weight. Appropriate instructions can be included to result in a liquid mixture suitable for preparation of second frozen pellets, e.g., a liquid containing about 60% to about 85% by weight of a milk fluid, about 10% to about 20% by weight of a sweetener, and about 0.2% to about 0.6% by weight of a stabilizer mix.

The instructions can further provide instructions related to one or more methods for forming the frozen pellets of the present invention, as described previously. Thus, instructions can indicate that the liquid mixtures may be frozen as slabs and cut into the appropriate shape, or frozen in molds of the appropriate shape and size. Other methods include those described in U.S. Pat. Nos. 5,126,156; 5,664,422; and 6,000,229, or the use of a Frigoscandia® freezer, as described previously. Finally, the instructions may indicate that the frozen pellets can be packaged in a container.

The invention will be further described in the following examples, which do not limit the scope of the invention described in the claims.

EXAMPLES

Example 1

Preparation of First and Second Frozen Pellets

First Frozen Pellets

| Ingredients: | Weight: | Percent by weight: |
|---|---|---|
| Whole milk | 240.00 g | 54.258 |
| Trehalose | 60.00 g | 13.565 |
| Heavy cream (40%) | 140.00 g | 31.651 |
| Carageenan | 1.07 g | 0.242 |
| Vanilla, pure | 1.00 g | 0.226 |
| Ethyl Vanillin | 0.10 g | 0.023 |
| Sucralose | 0.16 g | 0.036 |

Procedure: The dry ingredients were weighed and then blended to disperse. The milk and cream were weighed together. Sucralose and flavorings were added to the milk and cream. While whisking the milk and cream mixture, the dry ingredients were added and the mixture was heated to 190° F. to solubilize the ingredients. The mixture was removed from the heat, and cooled in an ice bath to 40° F. The contents were poured into a shallow pan in a layer 0.25 in. thick and frozen quickly in dry ice. The mixture was allowed to temper overnight in freezer (0° F.). The pan was removed from the freezer, and the frozen mixture cut into pellets in the shape of cubes approximately 0.25 in. on a side. Pellets were held at 0° F. and then packaged.

In other embodiments, the flavorings and/or sweetener (e.g., sucralose) were added after cooling to 40° F. In yet other embodiments, the mixture is pasteurized (e.g., in a method complying with FDA requirements) prior to freezing.

Nutritional analysis: Genesis Version 7.01, published by ESHA Research of Salem Oreg. (Copyright 2001) was used to estimate the nutritional content of the first frozen pellets, including percent daily value based on a 2000 calorie diet. Based on this estimate, a 125 g serving of the first frozen pellets will have the following: calories: 190; calories from fat: 80; total fat: 9 g (14% DV); saturated fat: 6 g (30% DV); cholesterol: 40 mg (13% DV); sodium: 60 mg (3% DV); total carbohydrate: 23 g (8% DV); dietary fiber: 0 g; sugars: 22 g; protein 4 g; vitamin A: 6%; calcium: 10%; iron: 0%; vitamin C: 2%.

Second Frozen Pellets

| Ingredients: | Weight: | Percent by weight: |
|---|---|---|
| Whole milk | 332.00 g | 83.177 |
| Trehalose | 48.00 g | 12.026 |
| Corn Syrup | 16.00 g | 4.009 |
| Gelatin | 1.90 g | 0.476 |
| Vanilla, pure | 1.00 g | 0.251 |
| Ethyl Vanillin | 0.090 g | 0.023 |
| Sucralose | 0.16 g | 0.040 |

Procedure: The dry ingredients were weighed and then blended to disperse. The milk and corn syrup were weighed together. Sucralose and flavorings were added to the milk and cream. While whisking the milk and corn syrup mixture, the dry ingredients were added and the mixture was heated to 140° F. to solubilize the ingredients and held for 5 minutes. The mixture was removed from the heat, and cooled in an ice bath to 40° F. The contents were poured into a shallow pan in a layer 0.25 in. thick and frozen quickly in dry ice. The mixture was allowed to temper overnight in freezer (0° F.). The pan was removed from the freezer, and the frozen mixture cut into pellets in the shape of cubes approximately 0.25 in. on a side. Pellets were held at 0° F. and then packaged.

In other embodiments, the flavorings and/or sweetener (e.g., sucralose) were added after cooling to 40° F. In yet other embodiments, the mixture is pasteurized (e.g., in a method complying with FDA requirements) prior to freezing.

Example 2

Formulations of First Frozen Pellets

The following tables set forth various formulations prepared for the first frozen pellets of the invention. Formulas 1-8 are useful for the preparation of first frozen pellets in methods and articles employing two sets of frozen pellets, while formulas 9-16 are useful in methods and articles employing one set of frozen pellets. Note that the "stabilizer" used in formulas 5-13 is a commercial blend of microcrystalline cellulose and sodium carboxymethylcellulose called Gelstar GC200 (FMC Corporation, Philadelphia, Pa.).

Formula 1:

| Ingredients: | Weight: | Percent by weight: |
|---|---|---|
| Whole milk | 240.00 g | 54.258 |
| Trehalose | 60.00 g | 13.565 |
| Heavy cream (40%) | 140.00 g | 31.651 |
| Carageenan | 1.07 g | 0.242 |
| Vanilla, pure | 1.00 g | 0.226 |
| Ethyl Vanillin | 0.10 g | 0.023 |
| Sucralose | 0.16 g | 0.036 |

Formula 2:

| Ingredients: | Weight: | Percent by weight: |
|---|---|---|
| Whole milk | 240.00 g | 54.014 |
| Trehalose | 60.00 g | 13.503 |
| Heavy cream (40%) | 140.00 g | 31.508 |
| Carageenan | 1.07 g | 0.241 |
| Gelatin | 2.00 | 0.450 |
| Vanilla, pure | 1.00 g | 0.225 |
| Ethyl Vanillin | 0.10 g | 0.023 |
| Sucralose | 0.16 g | 0.036 |

Formula 3:

| Ingredients: | Weight: | Percent by weight: |
|---|---|---|
| Whole milk | 140.00 g | 31.362 |
| Trehalose | 60.00 g | 13.441 |
| Heavy cream (40%) | 240.00 g | 53.763 |
| Carageenan | 3.14 g | 0.703 |
| Gelatin | 2.00 | 0.448 |
| Vanilla, pure | 1.00 g | 0.224 |
| Ethyl Vanillin | 0.10 g | 0.022 |
| Sucralose | 0.16 g | 0.036 |

Formula 4:

| Ingredients: | Weight: | Percent by weight: |
|---|---|---|
| Whole milk | 140.00 g | 31.226 |
| Trehalose | 60.00 g | 13.383 |
| Heavy cream (40%) | 240.00 g | 53.531 |
| Carageenan | 3.14 g | 0.700 |
| Gelatin | 2.00 | 0.446 |
| Vanilla, pure | 3.00 g | 0.669 |
| Sucralose | 0.20 g | 0.045 |

Formula 5:

| Ingredients: | Weight: | Percent by weight: |
|---|---|---|
| Whole milk | 140.00 g | 30.804 |
| Trehalose | 60.00 g | 13.202 |
| Heavy cream (40%) | 240.00 g | 52.806 |
| Carageenan | 1.57 g | 0.345 |
| Stabilizer | 2.60 | 0.572 |
| Gelatin | 2.00 | 0.440 |
| Vanilla, pure | 8.00 g | 1.760 |
| Sucralose | 0.32 g | 0.070 |

Formula 6:

| Ingredients: | Weight: | Percent by weight: |
|---|---|---|
| Whole milk | 240.00 g | 53.294 |
| Trehalose | 60.00 g | 13.324 |
| Heavy cream (40%) | 140.00 g | 31.088 |
| Carageenan | 1.57 g | 0.349 |
| Stabilizer | 2.60 | 0.577 |
| Gelatin | 2.00 | 0.444 |
| Vanilla, pure | 4.00 g | 0.888 |
| Sucralose | 0.16 g | 0.036 |

Formula 7:

| Ingredients: | Weight: | Percent by weight: |
|---|---|---|
| Whole milk | 240.00 g | 45.388 |
| Maltodextrin | 80.00 g | 15.129 |
| Trehalose | 60.00 g | 11.347 |
| Heavy cream (40%) | 140.00 g | 26.477 |
| Carageenan | 1.57 g | 0.297 |
| Stabilizer | 2.60 | 0.492 |

-continued

| Ingredients: | Weight: | Percent by weight: |
|---|---|---|
| Lecithin | 0.60 | 0.113 |
| Vanilla, pure | 4.00 g | 0.756 |

Formula 8:

| Ingredients: | Weight: | Percent by weight: |
|---|---|---|
| Whole milk | 240.00 g | 45.388 |
| Maltodextrin | 80.00 g | 15.129 |
| Sugar solids (sucrose) | 60.00 g | 11.347 |
| Heavy cream (40%) | 140.00 g | 26.477 |
| Carageenan | 1.57 g | 0.297 |
| Stabilizer | 2.60 | 0.492 |
| Lecithin | 0.60 | 0.113 |
| Vanilla, pure | 4.00 g | 0.756 |

Formula 9:

| Ingredients: | Weight: | Percent by weight: |
|---|---|---|
| Whole milk | 240.00 g | 45.453 |
| Maltodextrin | 80.00 g | 15.151 |
| Sugar solids (sucrose) | 60.00 g | 11.363 |
| Heavy cream (40%) | 140.00 g | 26.514 |
| Carageenan | 0.57 g | 0.108 |
| Stabilizer | 2.60 | 0.492 |
| Lecithin | 0.60 | 0.114 |
| Vanilla, pure | 4.00 g | 0.756 |
| Sucralose | 0.25 g | 0.047 |

Formula 10:

| Ingredients: | Weight: | Percent by weight: |
|---|---|---|
| Whole milk | 240.00 g | 45.337 |
| Maltodextrin | 80.00 g | 15.112 |
| Sugar solids (sucrose) | 60.00 g | 11.334 |
| Heavy cream (40%) | 140.00 g | 26.447 |
| Carageenan | 1.57 g | 0.297 |
| Stabilizer | 2.60 | 0.491 |
| Lecithin | 0.60 | 0.113 |
| Vanilla, pure | 4.00 g | 0.756 |
| Sucralose | 0.60 g | 0.113 |

Formula 11:

| Ingredients: | Weight: | Percent by weight: |
|---|---|---|
| Whole milk | 240.00 g | 41.829 |
| Maltodextrin | 80.00 g | 13.943 |
| Sugar solids (sucrose) | 60.00 g | 10.457 |
| Heavy cream (40%) | 180.00 g | 31.371 |
| Carageenan | 1.57 g | 0.274 |
| Stabilizer | 2.60 | 0.453 |
| Lecithin | 0.60 | 0.105 |
| Vanilla, pure | 3.00 g | 0.523 |
| Soy Whipping Agent | 6.00 g | 1.046 |

Formula 12:

| Ingredients: | Weight: | Percent by weight: |
|---|---|---|
| Whole milk | 240.00 g | 41.611 |
| Maltodextrin | 80.00 g | 13.870 |
| Sugar solids (sucrose) | 60.00 g | 10.403 |
| Heavy cream (40%) | 140.00 g | 24.273 |
| Carageenan | 0.57 g | 0.099 |
| Stabilizer | 2.60 | 0.451 |
| Lecithin | 0.60 | 0.105 |
| Vanilla, pure | 3.00 g | 0.520 |
| Soybean oil | 50.00 g | 8.669 |

Formula 13:

| Ingredients: | Weight: | Percent by weight: |
|---|---|---|
| Whole milk | 240.00 g | 41.253 |
| Maltodextrin | 80.00 g | 13.751 |
| Sugar solids (sucrose) | 60.00 g | 10.313 |
| Heavy cream (40%) | 140.00 g | 24.064 |
| Carageenan | 0.57 g | 0.098 |
| Stabilizer | 2.60 | 0.447 |
| Lecithin | 0.60 | 0.103 |
| Vanilla, pure | 2.00 g | 0.344 |
| Soybean oil | 50.00 g | 8.594 |
| Soy Whipping Agent | 6.00 g | 1.031 |

Formula 14:

| Ingredients: | Weight: | Percent by weight: |
|---|---|---|
| Whole milk | 240.00 g | 43.68 |
| Corn Syrup | 60.00 g | 10.92 |
| Sugar solids (sucrose) | 60.00 g | 10.92 |
| Heavy cream (40%) | 140.00 g | 25.48 |
| Carageenan | 1.50 g | 0.27 |
| Lecithin | 0.50 | 0.09 |
| Vanilla, pure | 2.00 g | 0.36 |
| Soybean oil | 40.00 g | 7.28 |
| Soy Whipping Agent | 5.50 g | 1.00 |

Formula 15:

| Ingredients: | Weight: | Percent by weight: |
|---|---|---|
| Whole milk | 281 g | 70.299 |
| Sugar solids (sucrose) | 20 g | 5.00 |
| Corn Syrup | 4 g | 1.00 |
| 65% High Maltose Syrup | 8 g | 2.00 |
| Cream | 62.4 g | 15.60 |
| Flvr Vanillin | 1.04 g | 0.26 |
| Ethyl Vanillin | 0.08 g | 0.02 |
| Stabilizer, Daritech FR 102 | 1.2 g | 0.30 |
| Inulin | 14 g | 3.50 |
| Maltodextrin 10DE | 8 g | 2.00 |
| Sucralose | 0.072 g | 0.018 |

Procedure: The dry ingredients were weighed and then blended to disperse. The milk and corn syrup were weighed together. Sucralose and flavorings were added to the milk and cream. While whisking the milk and corn syrup mixture, the dry ingredients were added and the mixture was heated to 140° F. to solubilize the ingredients and held for 5 minutes. The mixture was then homogenized at 500 and 2500 PSI and then pasteurized using a pilot scale thermal process. The mix was then cooled to around 10° C. and then allowed to age for between 4 and 24 hours. A pilot scale 20 liter liquid Dewar was filled with liquid nitrogen to create a bath and drops were created by pouring the pellet mix liquid through a strainer. This created frozen pellets of small diameter which were spherical.

In other embodiments, the flavorings and/or sweetener (e.g., sucralose) were added after cooling to 40° F. In yet other embodiments, the mixture is pasteurized (e.g., in a method complying with FDA requirements) prior to freezing.

Formula 16:

| Ingredients: | Weight: | Percent by weight: |
| --- | --- | --- |
| Whole milk | 281 g | 70.257 |
| Sugar solids (sucrose) | 40 g | 10.00 |
| Corn Syrup | 4 g | 1.00 |
| 65% High Maltose Syrup | 12 g | 3.00 |
| Cream | 60.6 g | 15.160 |
| Flvr Vanillin | 1.04 g | 0.26 |
| Ethyl Vanillin | 0.08 g | 0.02 |
| Stabilizer, Daritech FR 102 | 1.2 g | 0.30 |
| Sucralose | 0.04 g | 0.010 |

Procedure: The dry ingredients were weighed and then blended to disperse. The milk and corn syrup were weighed together. Sucralose and flavorings were added to the milk and cream. While whisking the milk and corn syrup mixture, the dry ingredients were added and the mixture was heated to 140° F. to solubilize the ingredients and held for 5 minutes. The mixture was then homogenized at 500 and 2500 PSI and then pasteurized using a pilot scale thermal process. The mix was then cooled to around 10° C. and then allowed to age for between 4 and 24 hours. A pilot scale 20 liter liquid Dewar was filled with liquid nitrogen to create a bath and a drops were created by pouring the pellet mix liquid through a strainer. This created frozen pellets of small diameter which were spherical.

Example 3

Formulations of Second Frozen Pellets

The following tables set forth various formulations prepared for the second frozen pellets of the invention.

Formula 1:

| Ingredients: | Weight: | Percent by weight: |
| --- | --- | --- |
| Whole milk | 332.00 g | 83.177 |
| Trehalose | 48.00 g | 12.026 |
| Corn Syrup | 16.00 g | 4.009 |
| Gelatin | 1.90 g | 0.476 |
| Vanilla, pure | 1.00 g | 0.251 |
| Ethyl Vanillin | 0.090 g | 0.023 |
| Sucralose | 0.16 g | 0.040 |

Formula 2:

| Ingredients: | Weight: | Percent by weight: |
| --- | --- | --- |
| Whole milk | 332.00 g | 82.772 |
| Trehalose | 48.00 g | 11.967 |
| Corn Syrup | 16.00 g | 3.989 |
| Gelatin | 1.90 g | 0.474 |
| Vanilla, pure | 3.00 g | 0.748 |
| Sucralose | 0.20 g | 0.050 |

Formula 3:

| Ingredients: | Weight: | Percent by weight: |
| --- | --- | --- |
| Whole milk | 332.00 g | 81.756 |
| Trehalose | 48.00 g | 11.820 |
| Corn Syrup | 16.00 g | 3.940 |
| Gelatin | 1.90 g | 0.468 |
| Vanilla, pure | 8.00 g | 1.970 |
| Sucralose | 0.160 g | 0.039 |
| Yellow #5 | 0.025 | 0.006 |

Formula 4:

| Ingredients: | Weight: | Percent by weight: |
| --- | --- | --- |
| Whole milk | 332.00 g | 83.438 |
| Trehalose | 48.00 g | 12.063 |
| Corn Syrup | 16.00 g | 4.021 |
| Gelatin | 1.90 g | 0.478 |

Formula 5:

| Ingredients: | Weight: | Percent by weight: |
| --- | --- | --- |
| Whole milk | 332.00 g | 83.438 |
| Sugar solids (sucrose) | 48.00 g | 12.063 |
| Corn Syrup | 16.00 g | 4.021 |
| Gelatin | 1.90 g | 0.478 |

Example 4

Preparation of a Frozen Beverage

A number of frozen beverages were prepared according to the methods and compositions of the present invention. For methods employing first frozen pellets, first frozen pellets prepared with formulations 9-14, set out above, were used. 100 g of the first frozen pellets in a shaker cup were manually shaken vigorously with 100 g of the liquid for 30 sec. Generally, the liquid for mixing was whole milk. Frozen beverages of a desirable consistency, flavor, and mouth feel were obtained.

For methods employing first and second frozen pellets, first frozen pellets corresponding to formulations 1-8 and second frozen pellets corresponding to formulations 1-5 were prepared. To prepare a frozen beverage, first frozen pellets and second frozen pellets were placed in a shaker cup in a ratio of 40:60, respectively, or 50 grams first frozen pellets and 75 grams second frozen pellets. Depending on desired consistency of the end product, 100 to 150 grams of whole milk were added to the 125 g of total frozen pellets in the container. The mixture was shaken vigorously for about 30 seconds, and frozen beverages of a desirable consistency, flavor, and mouth feel were obtained.

Nutritional analysis: Genesis Version 7.01, published by ESHA Research of Salem Oreg. (Copyright 2001) was used to estimate the nutritional content of a frozen beverage prepared as above using first frozen pellets having first frozen pellet formulation 1, and second frozen pellets having second frozen pellet formulation 1, with whole milk as the liquid for mixing. The nutritional data includes percent daily value based on a 2000 calorie diet. Based on this estimate, a 250 g serving of the frozen beverage will have the following: calories: 270; calories from fat: 120; total fat: 13 g (21% DV); saturated fat: 9 g (43% DV); cholesterol: 55 mg (19% DV); sodium: 120 mg (5% DV); total carbohydrate: 29 g (10% DV); dietary fiber: 0 g; sugars: 27 g; protein 8 g; vitamin A: 10%; calcium: 25%; iron: 0%; vitamin C: 4%.

Example 5

Viscosity Testing of Frozen Beverages

Frozen beverages of the present invention were characterized by viscometry measurements. Flow distance of a frozen beverage over a set time period was measured in a consistometer device (Bostwick Consistometer, CSC Scientific Co., Fairfax, Va.). Results were compared to a "gold standard" frozen beverage (e.g., a traditional milk shake made at home with ice cream and milk in a blender, or a milk shake purchased from a fast food outlet). A typical homemade milk shake was prepared with equal parts of ice cream (e.g., Haagen-Dazs®) to whole milk and blended in a household blender for about 15 to 20 sec.

Two frozen beverages and one traditional milk shake were prepared and immediately tested by pouring a sample of each into a Bostwick consistometer chamber. The flow distance of the icy slush portion of each was read after 15 seconds of flow. The remaining portions of the frozen beverage and the traditional milk shake were allowed to sit for 5 minutes and the measurements were repeated. The results were as follows:

Sample #1
Frozen Beverage: Reading at time 0: <0.5 cm/15 seconds
Frozen Beverage: Reading at 5 minutes: 10 cm/15 seconds Sample #2
Frozen Beverage: Reading at time 0: 0.5 cm/15 seconds
Frozen Beverage: Reading at 5 minutes: 12 cm/15 seconds Traditional Milkshake (Home-Made)
Reading at time: 0: 20 cm/15 seconds
Reading at 5 minutes: >23 cm/15 seconds In general, these results show that the frozen beverages prepared according to the method of the present invention are slushier and thus thicker products than an home-made milk shake.

Example 6

Analysis of Physical Properties of Pellets

Experimental methods were developed to determine melting rate, hardness, and melting temperatures of first pellets. First pellets having two different sweetener profiles were prepared. The effect of overrun was also examined. In addition, the effects of three different coatings were investigated to understand whether coating affects the appearance and flowability of the pellets.

The viscosity of pellet mixes and the coating solutions were analyzed. Frozen pellets were analyzed for hardness, melting rate, and melting profile during a 4 week storage in a freezer. Furthermore, the effect of tempering on pellet melting properties and hardness was investigated. The main findings of this study are given below:

1. A combination of sugar and inulin as a sweetener resulted in a slower melting rate as compared to sugar or inulin alone. Thus, inulin was found to improve the melting behavior of the pellets.
2. Neither the composition of the pellets nor the tempering profile altered or improved the melting properties significantly.
3. Polysorbate 80, added as an emulsifier, caused an increase in the melting rate, which may not be desirable in certain circumstances.
4. With the exception of starch-coated pellets, there were no significant differences in melting rate and melting temperature between coated and uncoated pellets.
5. Coated pellets, however, had a significantly better appearance and flowability as compared to uncoated pellets.

This study was conducted in two phases. During the first phase, two different pellet compositions were analyzed for hardness, melting rate, viscosity, and melting onset temperature. One of the pellet compositions was whipped to result in overrun, and similarly analyzed. The second phase was to examine the effect of three coating materials on viscosity, melting rate, and melting onset temperature of the pellets.

Phase I Compositions and Analysis

In the first phase, two pellet formulations were designed to have two different sweetener profiles, and one was whipped to evaluate the effects of composition and whipping on melting properties and hardness of the pellets. The sweetener profiles are given below:

Pellet I—sugar formulation
Pellet II—inulin formulation
Pellet III—sugar formulation, but whipped to result in overrun Table 1 shows the formulations. Note that Pellet I formulation was whipped at chilled temperature to result in overrun (Pellet III).

TABLE 1

Composition of Pellet Mixes I, II and III

| Ingredient | % Weight (w/w) |
| --- | --- |
| Pellets I and III | |
| Sweetener 25% Sucralose | 0.04 |
| Sugar (ICSC) | 10.00 |
| Corn Syrup Solids (42 DE) dry basis | 1.00 |
| Satin Sweet 65% High Maltose Corn Syrup | 3.00 |
| Milk (ICSC) | 70.227 |
| Cream (ICSC) | 15.163 |
| Flavor, Vanilla 4x (Nielsen-Massey) | 0.25 |
| Ethyl Vanillin | 0.02 |
| Stabilizer, Daritech FR 102, Degussa | 0.30 |
| Pellet II | |
| Sweetener 25% Sucralose | 0.10 |
| Corn Syrup Solids (42 DE) dry basis | 1.00 |
| Satin Sweet 65% High Maltose Corn Syrup | 4.00 |
| Milk (ICSC) | 70.227 |
| Cream (ICSC) | 15.603 |
| Flavor, Vanilla 4x (Nielsen-Massey) | 0.25 |
| Ethyl Vanillin | 0.02 |
| Stabilizer, Daritech FR 102, Degussa | 0.30 |
| Inulin, Instant, Oliggo-Fiber | 3.50 |
| Maltodextrin (10DE) | 5.00 |

The pellet mixes were heated to 185° F. for two minutes and homogenized at 500 and 3000 PSI with a two-stage homogenizer. The mixes were aged overnight and the viscosity was measured. Pellet III formulation was whipped at chilled temperature and overrun was compared to the unwhipped formulation (Pellet I).

Both pellets and pucks were prepared by freezing the mixes using liquid nitrogen:

Pellets were prepared by dripping the mix thorough a strainer into a liquid nitrogen bath to obtain round pellets;

Pucks were prepared by filling the mix into a plastic container in the amount of 42+/−2 gram, then dipping the container in liquid nitrogen.

After whipping, the Pellet III mix had an overrun value of 101.4%. However, this overrun could not be maintained during production of frozen pellets and pucks due to the collapsing of air cells; they appeared to shudder upon contact with liquid nitrogen.

Pellets and pucks were placed into two different freezer temperatures: a domestic freezer (−10° F. (−23.3° C.)) and a commercial freezer (−26° F. (−32.2° C.), for a week. After completion of one-week storage, the samples (pellets and pucks) were transferred to the domestic freezer. Effects of tempering were evaluated by measuring melting rate and melting temperatures after 2 and 4 weeks of production.

Melting Rate

Two different sets of frozen samples, pucks and pellets, of a pellet mix were analyzed to calculate the melting rate.

Puck-Shape Samples

The pellet mix was filled into sample cups to make a puck-shape sample that weighed 42+/−2 grams. The sample was frozen in liquid nitrogen. The frozen puck sample was placed on a wire screen (10 holes/cm) on a top of a funnel that was attached to a graduated cylinder. Every 5 minutes, the dripped volume was recorded for up to 40 minutes. The temperature of the room was kept constant at 22° C. The time in minutes was plotted against the dripped volume (mL) and slope of the main melting event was taken as the melting rate.

Pellets 10 grams of pellets were placed on a wire screen (10 holes/cm) on a top of a funnel that was attached to a graduated cylinder. The dripped volume was recorded every 2 minutes up to 10 minutes. The temperature of the room was kept constant at 22° C. The time in minutes was plotted against the dripped volume (mL) and slope to the main melting event was taken as the melting rate.

Melting Profile

A Mettler DSC was used to determine melting profiles of the pellets. Samples were kept in a Styrofoam box with dry ice to prevent melting of the samples before loading the DSC. DSC sampling pans were also kept in the dry ice. Pellet samples of 10-15 mg were placed into a sampler holder. The DSC sample loading temperature was adjusted to −15° C. to prevent melting during loading and at the beginning of a heating scan. The temperature profile was held at −15° C. for a minute, then further cooling to −30° C. at a rate of 5° C./min and heating from −30° C. to 40° C. at a rate of 5° C./min. The onset temperature of the melting peak was chosen as a melting temperature.

Hardness

A texture analyzer (TA-Hdi, Stable Micro Systems) was used to measure the hardness of pucks stored at both commercial and domestic freezer temperatures. Samples were kept in dry ice until analysis. The surface of the measurement stand and the probe were cooled by placing dry ice on their surfaces. Samples were quickly transported to the texture analyzer, and the analyses were completed within 30 s to minimize variability due to sample warming. A 42 g stainless steel probe (TA-42 (45° Chisel), Stable Micro Systems) was used to measure the force required for 7 mm penetration into the samples, with force directly proportional to the hardness. Three measurements were taken per sample.

Mix Viscosity

A rheometer (Paar Physica) was used to measure the viscosity of freshly prepared pellet mixes at 25° C. and at 5° C. after 24 hours of aging in a refrigerator as a function of shear rate from high to low (200 to 0.1 s$^{-1}$) and from low to high (0.1 to 200 s$^{-1}$). In addition, flow behaviors of the pellet mixes were determined.

Results and Discussion

The viscosities of the mixes at 25° C. were not significantly different as a function of shear rate. As expected, after aging overnight at refrigeration temperature, the viscosity of the mixes increased due to the decrease in temperature. However, no significant difference in viscosity was observed between Pellet I and II formulations at 5° C. The viscosity of the mixes decreased as the shear rate decreased. Thus, the mixes had shear thinning behavior, which should be considered during production.

With respect to melting rates, the Pellet I pellets had the fastest melting rate, followed by the Pellet III whipped pellets, whereas the Pellet II pellets had the slowest melting rate. The trend did not change after 4 weeks of storage. Additionally, the results suggest that freezer temperatures and tempering of pellets between two different temperatures did not significantly change the melting rates of the pellets. The pucks made with inulin had the slowest melting rate, whereas Pellet I and III pucks had the fastest melting rate. These results suggest that the size of the frozen piece, either in pellet shape or puck shape, may not affect the melting rate. The composition of the formulation, e.g., sugar versus inulin, seemed to be the most important parameter affecting the melting rate.

In general, the hardness of the Pellet I and II pucks did not significantly change over the course of the storage. At zero time, Pellet I pucks were the hardest, whereas Pellet II pucks were the softest. The Pellet III pucks made had intermediate hardness. After storage in two different freezer temperatures for a week, their hardness profiles changed. The Pellet III pucks were the softest, followed by the Pellet I pucks. The Pellet II pucks were the hardest.

Additionally, the temperature of the freezer was found to affect the hardness. Pucks held at −26° F. were harder than ones held at −10° F. After 1 week, the pucks were stored at −10° F. for an additional week. The hardness analysis showed that the samples first stored at −26° F. and then at −10° F. got slightly softer, while the samples held at −10° F. the entire time got harder. It should be noted, however, that the surfaces of the pucks were not flat due to difficulties in making flat surface pucks in liquid nitrogen and thus the comparison of hardness may be misleading. Therefore, the hardness measurements were not performed after the two-week storage.

Melting onset temperatures were determined from the melting curves obtained from DSC analysis. Table 2 tabulates the melting onset temperatures of the pellets as a function of storage time. At t=0, immediately after production of the pellets, the melting onset temperatures of the Pellets III, I, and II were −3.4° C., −4.2° C., and −2.7° C., respectively. After one week storage at two different freezer temperatures, all pellets were transferred into the domestic freezer. At the end of the four week storage, pellets I and III had lower melting onset temperatures than pellets II. This result confirms the conclusion that the addition of inulin was successful in increasing the melting onset temperature, which may be important to give increased stability to the pellets during the freeze-thaw cycles that occur during distribution and storage.

TABLE 2

DSC Melting Onset Temperature

| Time (weeks) | Pellet I Domestic Freezer | Pellet I Commercial Freezer | Pellet II Domestic Freezer | Pellet II Commercial Freezer | Pellet III Domestic Freezer | Pellet III Commercial Freezer |
|---|---|---|---|---|---|---|
| 0 | −4.2 | −4.2 | −2.7 | −2.7 | −3.4 | −3.4 |
| 1 | −1.0 | −3.7 | 0.5 | −1.1 | −1.1 | −2.8 |
| 2 | −2.2 | 0.2 | −3.1 | −3.4 | −5.0 | −4.5 |
| 4 | −3.6 | −4.9 | −0.5 | −2.9 | −3.6 | −5.1 |

Phase II—Effects of Coatings on Pellet Behavior

Based on the results of Phase I, a new formulation was prepared that included a mixture of sugar and inulin, Pellet IV. In addition, another formulation, Pellet V, was prepared to determine effects of a stabilizer, Polysorbate 80, on the melting properties of the pellets. The formulations of Pellets IV and V are given in Table 3.

TABLE 3

Formulations of Pellets IV and V

| Ingredients | % Weight (w/w) |
|---|---|
| Pellet IV | |
| Sweetener 25% Sucralose | 0.070 |
| Corn Syrup Solids (42 DE) dry basis | 1.000 |
| Satin Sweet 65% High Maltose Corn Syrup | 2.000 |
| Milk (ICSC) | 70.257 |
| Cream (ICSC) | 15.603 |
| Flavor, Vanilla 4x (Nielsen-Massey) | 0.250 |
| Ethyl Vanillin | 0.020 |
| Stabilizer, Daritech FR 102, Degussa | 0.300 |
| Inulin, Instant, Oliggo-Fiber | 3.500 |
| Maltodextrin (10DE) | 2.000 |
| Sugar (ICSC) | 5.000 |
| Pellet V | |
| Sweetener 25% Sucralose | 0.070 |
| Corn Syrup Solids (42 DE) dry basis | 1.000 |
| Satin Sweet 65% High Maltose Corn Syrup | 2.000 |
| Milk (ICSC) | 70.157 |
| Cream (ICSC) | 15.603 |
| Flavor, Vanilla 4x (Nielsen-Massey) | 0.250 |
| Ethyl Vanillin | 0.020 |
| Stabilizer, Daritech FR 102, Degussa | 0.300 |
| Inulin, Instant, Oliggo-Fiber | 3.500 |
| Maltodextrin (10DE) | 2.000 |
| Sugar (ICSC) | 5.000 |
| Polysorbate 80 | 0.100 |

Pellets were prepared as described above. Melting rate and melting temperatures of the pellets were determined as described above. Pellets were kept in a commercial freezer (−26° F.) for a week, then transferred to a domestic freezer (−10° F.). The effects of coating materials on the melting properties and appearance of the pellets were also examined. Three different coating solutions were prepared:

Solution 1—4% cold swelling starch—Polar Tex 06748
Solution 2—2% defoamer SAG 100, 1% sodium citrate
Solution 3—10% Trehalose solution The coating solutions were used to coat Pellet IV pellets. The pellets were coated by spraying the coating solution onto pellets, and liquid nitrogen was poured down over the pellets to keep them cold. The process was repeated several times until the formation of a visible and smooth coat on the surface of the pellets. The pellets were coated with Solution 1, 2 or 3 alone.

A Mettler DSC was used to investigate crystallization and melting behavior of the coating solutions. A coating solution was placed into a DSC sample pan in the amount of 6-12 milligrams. The sample pans were then transferred into the DSC at room temperature. The samples were cooled to −30° C. at a rate of 2° C./min to observe their crystallization behavior, and heated up to 15° C. at the same rate to observe melting behavior of the crystals. Table 4 shows the crystallization onset temperature and melting onset temperature of the coating solutions.

TABLE 4

Crystallization and Melting Behavior of Coating Solutions

| Coating Solution | Crystallization Onset Temperature (° C.) | Melting Onset Temperature (° C.) |
|---|---|---|
| 4% cold swelling starch | −19.96 | 1.85 |
| 2% SAG + 1% Sodium Citrate | −19.47 | −1.36 |
| 10% trehalose | −15.74 | −2.31 |

The results showed that crystallization onset temperatures of the 4% cold swelling starch and 2% SAG+1% Sodium Citrate solutions were very similar to each other, whereas their melting onset temperatures were significantly different from each other. This result implies that the solids used in these solutions may affect the structure of the ice crystals. The 10% trehalose solution had a higher crystallization temperature and lower melting onset temperature as compared to the others. Thus, the composition or amount of solid, or both, affected the crystallization and melting profile of the coating solutions.

Melting temperatures of the pellets were determined according to the method given in above. As mentioned previously, based on the results of the Phase I study, there was no significant effect of the freezer temperatures investigated in this study on the melting behavior of the pellets. In Phase II, we decided to mimic ice cream storage conditions. Thus, pellets and pucks were kept in a commercial freezer (−26° F. (−32.2° C.)) for a week, and then were transferred to a domestic freezer and held there for 4 weeks.

TABLE 5

Melting Onset Temperature of Pellets

| Time (Weeks) | Pellet IV | Pellet V | Pellet IV + 10% Trehalose | Pellet IV + 4% Starch | Pellet IV SAG + 1% SC |
|---|---|---|---|---|---|
| 1 | −3.9 | −4.1 | −3.2 | −3.8 | −0.6 |
| 2 | −3.6 | −0.4 | −0.8 | −3.2 | −3.6 |
| 4 | −4.3 | −4.2 | −3.8 | −2.2 | −3.3 |

After one week storage, the melting onset temperature of Pellet IV (uncoated) was around −4° C. Coating Pellet IV with trehalose and starch did not make a significant difference in the melting onset temperature, whereas coating with 2% SAG+1% Sodium Citrate increased the melting onset temperature to 0.6° C. After one week storage time in the commercial freezer at −26° F., all pellets were transferred in to a domestic freezer at −10° F. After two-week storage at domestic freezer temperatures, the melting onset temperatures of the pellets was variable, but eventually at the end of the fourth week, the melting onset temperatures of pellets IV settled at around −4.3° C. The trehalose-coated pellets had slightly higher melting onset temperatures than the uncoated ones, but the difference was not significant. The starch-coated pellets had better melting behavior than both the trehalose-coated and SAG+sodium citrate-coated pellets. Addition of the surfactant Polysorbate 80 (Pellet V) did not affect the melting onset temperature of Pellet IV after a four-week storage.

Except for the starch coating, the coating materials did not significantly affect the melting behavior of Pellet IV. However, the coated pellets had more flowability as compared to uncoated Pellets IV and V. After four-week storage, the uncoated pellets stuck to one another and it was difficult to remove them from the containers. Thus, coated pellets had better appearance and flowability than uncoated pellets. Coating pellets improved handling and storage quality which may be important during pellet storage.

Pellets IV and V demonstrated a difference in melting rate during the first two weeks; however, at the end of the fourth week, the melting rates were not significantly different. In general, the coated Pellet IV pellets had a faster melting rate as compared to uncoated Pellet IV pellets. The type of coating material did not significantly affect the melting rate. These results align with the findings of the DSC analysis in which we did not observe a significant effect of coating materials on the melting behavior of pellets.

Conclusions—Effect of Coatings on Pellet Behavior
1. The melting and crystallization behavior of the coating materials showed some differences. Both starch and SAG+Sodium citrate solutions crystallized at around −20° C., whereas the trehalose solution crystallized at around −15° C. Melting temperatures of the crystals were found to be different from each other. These results suggested that either the composition or amount of solid, or both, affected the crystallization and melting profiles of the coating solutions.
2. Melting onset temperatures of the pellets were variable during a two-week storage; however, after a four-week-storage, they had a similar melting profile, with the exception of the starch-coated pellets. Polysorbate 80 seemed to increase the melting rate of the pellets.
3. Except for the starch coating, the coatings used herein did not significantly affect the melting behavior of the pellets.
4. Coated pellets had better appearance and flowability than uncoated pellets.

Example 7

Effect of Scale-Up on Pellet Properties

The objective of this study was to analyze melting properties of pellets produced at a pilot-plant scale in two 1400 lb batches. The melting properties of the pellets produced at lab- and pilot-scale were compared. Nutritional analyses and sensory evaluations were also performed. Formulations for Pellets VI and VII are shown below.

TABLE 6

Composition of Pellets VI and VII

| Ingredients | % Weight (w/w) |
|---|---|
| Pellets VI | |
| Sucralose | 0.01 |
| Sugar (ICSC) | 10.00 |
| Corn Syrup Solids (42 DE) dry basis | 1.00 |
| Satin Sweet 65% High Maltose Corn Syrup | 3.00 |
| Milk (ICSC) | 70.257 |
| Cream (ICSC) | 15.163 |
| Flavor, Vanilla 4x (Nielsen-Massey) | 0.25 |
| Ethyl Vanillin | 0.02 |
| Stabilizer, Daritech FR 102, Degussa | 0.30 |
| 1. Pellets VII | |
| Sucralose | 0.0175 |
| Corn Syrup Solids (42 DE) dry basis | 1.00 |
| Satin Sweet 65% High Maltose Corn Syrup | 2.00 |
| Milk (ICSC) | 70.299 |
| Cream (ICSC) | 15.603 |
| Flavor, Vanilla 4x (Nielsen-Massey) | 0.26 |
| Ethyl Vanillin | 0.02 |
| Stabilizer, Daritech FR 102, Degussa | 0.30 |
| Inulin, Instant, Oliggo-Fiber | 3.50 |
| Maltodextrin (10DE) | 2.00 |
| Sugar (ICSC) | 5.00 |

The melting rates and melting temperatures of the pellets are shown in Table 7.

TABLE 7

Melting Rate and Melting Onset Temperature of Pellets VI and VII

| Sample | Melting Rate (ml/min) | Melting Onset Temperature (° C.) |
|---|---|---|
| Pellets VI | 0.5 | −4.5 |
| Pellets VII | 0.1 | −2.2 |

The melting onset temperature of Pellets VI was −4.5° C., whereas the melting onset temperature of Pellets VII was −2.2° C. Thus, inulin-containing pellets start to melt at a higher temperature than the sucrose-containing pellets. In addition, Pellets VI made with sucrose had a faster melting rate than Pellets VII made with inulin. Pellets VI melted 5× faster than Pellets VII. The difference in melting onset temperatures indicates better temperature stability of Pellets VII as compared to Pellets VI, as Pellets VII would be less likely to melt during storage and distribution. In addition, Pellets VII maintained their shape during the experiment time, suggesting a possible strong binding between molecules.

Nutritional analysis of Pellets VI indicated 7.15% milkfat, 2.54% protein, and 28.6% solids. Nutritional analysis of Pellets VII indicated 7.87% milkfat, 2.65% protein, and 29% solids.

After two months of storage at −20° F., Pellets VI and VII were made into a milkshake, as described previously. Pellets VI produced a frozen beverage that had vanilla flavor, but was a little watery, had an icy texture, and lacked some dairy notes. Pellets VII produced a frozen beverage that had a creamy mouthfeel with much better flavor retention. A Brookfield viscometer confirmed that the pellets containing inulin (Pellets VII) had increased viscosity.

Overall, inulin improved the melting behavior of the pellets, their shape retention, and their sensory qualities. In addition, the findings of the previous study which investigated pellets produced at laboratory scale were confirmed when the pellets were produced at pilot scale.

A number of embodiments of the invention have been described. Nevertheless, it will be understood that various modifications may be made without departing from the spirit and scope of the invention. Accordingly, other embodiments are within the scope of the following claims

What is claimed is:

1. A method for making a frozen beverage comprising:
   a) providing first frozen pellets comprising a milk fluid, a sweetener, a flavoring, and a stabilizer mix, wherein said milk fluid is about 25% to about 78% by weight of said first frozen pellets;
   b) providing second frozen pellets comprising a milk fluid, a sweetener, and a stabilizer mix, wherein said milk fluid is about 60% to about 85% by weight of said second frozen pellets;
   c) providing a liquid; and
   d) mixing said first frozen pellets, said second frozen pellets, and said liquid for a time sufficient to result in a substantially homogeneous frozen beverage.

2. The method of claim 1, wherein said first and second frozen pellets are, independently, pellets of relatively uniform shape and size.

3. The method of claim 2, wherein said liquid is selected from the group consisting of water, milk, skim milk, 1% milk, 2% milk, heavy cream, light cream, half and half, soy milk, juice, yogurt juice, and mixtures thereof.

4. The method of claim 1, wherein said mixing is achieved by manual or mechanical mixing, stirring, and shaking.

5. The method of claim 1, wherein said first frozen pellets are provided at about 60% to about 70% by weight of said second frozen pellets.

6. The method of claim 1, wherein said liquid is provided in an amount of about 50% to about 150% by weight of the combined weight of said first and second frozen pellets.

7. The method of claim 1, wherein said mixing occurs for a time from about 10 seconds to about 2 minutes.

8. The method of claim 1, further comprising providing flavoring particulates selected from the group consisting of fruit and confections prior to said mixing.

* * * * *